(12) United States Patent
Schoolcraft

(10) Patent No.: US 9,382,988 B2
(45) Date of Patent: Jul. 5, 2016

(54) SPLIT POWER INFINITELY VARIABLE TRANSMISSION ARCHITECTURE INCORPORATING A PLANETARY TYPE BALL VARIATOR WITH MULTIPLE FIXED RANGES

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/517,426

(22) Filed: Oct. 17, 2014

(65) Prior Publication Data

US 2016/0109006 A1 Apr. 21, 2016

(51) Int. Cl.
*F16H 37/02* (2006.01)
*F16H 37/08* (2006.01)
*F16H 15/52* (2006.01)

(52) U.S. Cl.
CPC ............. *F16H 37/086* (2013.01); *F16H 15/52* (2013.01); *F16H 2037/0893* (2013.01); *F16H 2200/2015* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 2,347,873 A | 5/1944 | Bloomfield | |
| 2,410,818 A | 11/1946 | Grant | |
| 2,554,221 A | 5/1951 | Stephenson et al. | |
| 2,583,843 A | 1/1952 | Herrick | |
| 2,596,654 A | 5/1952 | Clark et al. | |
| 2,718,292 A | 9/1955 | Meilander et al. | |
| 2,841,330 A | 7/1958 | Brewer et al. | |
| 3,324,744 A | 6/1967 | Roper | |
| 3,410,157 A * | 11/1968 | Livezey | 475/276 |
| 3,432,016 A | 3/1969 | Vogt | |
| 3,481,436 A | 12/1969 | Wilkowski | |
| 3,631,741 A | 1/1972 | Kelbel | |
| 4,004,473 A * | 1/1977 | Pearce et al. | 475/66 |
| 4,107,776 A | 8/1978 | Beale | |
| 4,114,478 A | 9/1978 | Clauss | |

(Continued)

FOREIGN PATENT DOCUMENTS

DE 102007013493 A1 * 9/2008 ............. F16H 47/04
EP 1519084 A2 9/2004

(Continued)

OTHER PUBLICATIONS

International Search Report and Written Opinion received for PCT International Application No. PCT/US2013/045580, completed Oct. 27, 2013, 3 pages.

(Continued)

*Primary Examiner* — Dirk Wright
(74) *Attorney, Agent, or Firm* — Barnes & Thornburg LLP

(57) ABSTRACT

A transmission includes an input shaft, an output shaft, at least five planetary gearsets, a variable-ratio unit, and at least six clutches. The input shaft is configured to receive torque from a drive unit. The output shaft is configured to transmit torque to a load. The at least five planetary gearsets, the variable-ratio unit, and the at least six clutches are arranged between the input shaft and the output shaft. The at least six clutches are selectively engageable in combination with one another to select one of at least eight operating modes.

20 Claims, 29 Drawing Sheets

(56) References Cited

U.S. PATENT DOCUMENTS

| | | | |
|---|---|---|---|
| 4,205,563 A * | 6/1980 | Gorrell | 475/59 |
| 4,361,217 A | 11/1982 | Bieber et al. | |
| 4,381,828 A | 5/1983 | Lunn et al. | |
| 4,742,733 A * | 5/1988 | Schreiner | 477/120 |
| 4,813,524 A | 3/1989 | Reik | |
| 4,856,374 A * | 8/1989 | Kreuzer | 475/189 |
| 5,062,050 A | 10/1991 | Petzold et al. | |
| 5,152,726 A | 10/1992 | Lederman | |
| 5,355,981 A | 10/1994 | Itoh et al. | |
| 5,407,024 A | 4/1995 | Watson et al. | |
| 5,441,130 A | 8/1995 | Ha | |
| 5,538,121 A | 7/1996 | Hering | |
| 5,584,776 A | 12/1996 | Weilant et al. | |
| 5,653,322 A | 8/1997 | Vasa et al. | |
| 5,662,198 A | 9/1997 | Kojima et al. | |
| 5,704,867 A | 1/1998 | Bowen | |
| 5,771,477 A | 6/1998 | Showalter et al. | |
| 5,833,566 A | 11/1998 | Showalter | |
| 5,884,526 A | 3/1999 | Fogelberg | |
| 5,893,812 A | 4/1999 | Narai et al. | |
| 5,918,715 A | 7/1999 | Ruth et al. | |
| 5,992,592 A | 11/1999 | Showalter | |
| 6,062,361 A | 5/2000 | Showalter | |
| 6,149,540 A | 11/2000 | Johnson et al. | |
| 6,149,543 A | 11/2000 | Breen | |
| 6,155,395 A | 12/2000 | Braford | |
| 6,251,045 B1 | 6/2001 | Oliveira et al. | |
| 6,358,178 B1 | 3/2002 | Wittkopp | |
| 6,460,671 B1 | 10/2002 | Karambelas et al. | |
| 6,585,619 B2 * | 7/2003 | Henzler | 475/214 |
| 6,588,559 B2 | 7/2003 | Blair | |
| 6,672,442 B2 | 1/2004 | Kato et al. | |
| 6,679,367 B2 | 1/2004 | Baker et al. | |
| 6,719,659 B2 * | 4/2004 | Geiberger et al. | 475/216 |
| 6,726,590 B2 * | 4/2004 | Henzler et al. | 475/216 |
| 6,790,153 B2 | 9/2004 | Goto | |
| 6,834,750 B2 | 12/2004 | Baker et al. | |
| 6,846,257 B2 | 1/2005 | Baker et al. | |
| 6,855,086 B2 * | 2/2005 | Elser et al. | 475/214 |
| 6,949,045 B2 * | 9/2005 | Wafzig et al. | 475/216 |
| 7,052,430 B2 | 5/2006 | Stevenson et al. | |
| 7,189,182 B2 | 3/2007 | Stevenson et al. | |
| 7,195,576 B2 * | 3/2007 | Toyoda et al. | 475/216 |
| 7,204,337 B2 | 4/2007 | Wildfellner | |
| 7,217,216 B2 * | 5/2007 | Inoue | 475/215 |
| 7,219,569 B2 | 5/2007 | Jastrzembowski et al. | |
| 7,326,146 B2 * | 2/2008 | Miyata et al. | 476/40 |
| 7,347,801 B2 * | 3/2008 | Guenter et al. | 475/216 |
| 7,407,459 B2 * | 8/2008 | Greenwood et al. | 475/215 |
| 8,083,631 B2 * | 12/2011 | Shiohara | 475/282 |
| 8,142,323 B2 * | 3/2012 | Tsuchiya et al. | 475/216 |
| 8,152,673 B2 | 4/2012 | Yanay | |
| 8,298,112 B2 | 10/2012 | Takada | |
| 8,617,020 B2 * | 12/2013 | Winter | 475/217 |
| 8,845,477 B2 * | 9/2014 | Koch et al. | 475/280 |
| 8,986,150 B2 * | 3/2015 | Versteyhe et al. | 475/214 |
| 8,996,263 B2 * | 3/2015 | Quinn et al. | 701/55 |
| 9,133,924 B2 * | 9/2015 | Schoolcraft | |
| 9,163,705 B1 * | 10/2015 | Hwang et al. | |
| 2002/0005325 A1 | 1/2002 | Yamada | |
| 2003/0051959 A1 | 3/2003 | Blair | |
| 2003/0226415 A1 | 12/2003 | Baker et al. | |
| 2004/0104096 A1 | 6/2004 | Genise | |
| 2006/0189435 A1 | 8/2006 | Flaig et al. | |
| 2009/0118912 A1 | 5/2009 | Hugenroth et al. | |
| 2009/0203486 A1 | 8/2009 | Murray | |
| 2010/0093479 A1 * | 4/2010 | Carter et al. | 475/159 |
| 2011/0144872 A1 | 6/2011 | Long et al. | |
| 2012/0072084 A1 | 3/2012 | Stoller et al. | |
| 2013/0338888 A1 | 12/2013 | Long et al. | |
| 2013/0338889 A1 | 12/2013 | Long et al. | |
| 2013/0338893 A1 | 12/2013 | Long et al. | |
| 2014/0274540 A1 | 9/2014 | Schoolcraft | |

FOREIGN PATENT DOCUMENTS

| | | |
|---|---|---|
| WO | 9849455 A2 | 11/1998 |
| WO | 2010048029 A2 | 4/2010 |
| WO | 2014039900 A1 | 3/2014 |
| WO | 2014125050 A1 | 8/2014 |

OTHER PUBLICATIONS

U.S. Appl. No. 61/660,666, dated Dec. 16, 2009, (31 pages).
Utility U.S. Appl. No. 14/517,400, dated Oct. 17, 2014.
Utility U.S. Appl. No. 14/517,374, dated Oct. 17, 2014.
Utility U.S. Appl. No. 14/517,380, dated Oct. 17, 2014.
Utility U.S. Appl. No. 14/517,364 dated Oct. 17, 2014.
Utility U.S. Appl. No. 14/517,410, dated Oct. 17, 2014.
Search Report and Written Opinion from the International Searching Authority for Application No. PCT/US2015/056009, dated Feb. 25, 2016, 13 pages.

* cited by examiner

| REGIME | C1 | C2 | C3 | C4 | C5 | C6 | C7 | MIN | FIXED | MAX | REGIME SHOWN IN FIG(S) |
|---|---|---|---|---|---|---|---|---|---|---|---|
| MODE 1 | X | | | | | | | -1.000 | | -0.425 | 6 |
| BYPASS 1 | X | | | | | X | X | | -0.712 | | 7 |
| SYNC 1-2 | X | | | | X | X | X | | -0.425 | | 8 |
| MODE 2 | X | | | X | | | | -0.425 | | -0.105 | 9 |
| BYPASS 2 | X | | | X | X | | X | | -0.265 | | 10 |
| SYNC 2-3 | X | | X | X | X | | | | -0.105 | | 11 |
| MODE 3 | X | | X | X | | | X | -0.105 | | 0.073 | 12, 13 |
| BYPASS 3 | X | | X | | | | | | -0.016 | | 14 |
| SYNC 3-4 | X | | X | X | | | | | 0.073 | | 15 |
| MODE 4 | X | | | X | | | | 0.073 | | 0.171 | 16 |
| BYPASS 4 | X | | X | | | | X | | 0.122 | | 17 |
| SYNC 4-5 | X | X | X | | | | | | 0.171 | | 18 |
| MODE 5 | | X | | | | | X | 0.171 | | 0.309 | 19 |
| BYPASS 5 | | X | X | | | | | | 0.240 | | 20 |
| SYNC 5-6 | | X | X | X | | | | | 0.309 | | 21 |
| MODE 6 | | X | | X | | | | 0.309 | | 0.556 | 22 |
| BYPASS 6 | | X | | X | | | X | | 0.432 | | 23 |
| SYNC 6-7 | | X | | X | X | | | | 0.556 | | 24 |
| MODE 7 | | X | | | X | | | 0.556 | | 1.000 | 25 |
| BYPASS 7 | | X | | | X | X | X | | 0.778 | | 26 |
| SYNC 7-8 | | X | | | X | X | | | 1.000 | | 27 |
| MODE 8 | | X | | | | X | | 1.000 | | 1.800 | 28 |
| BYPASS 8 | | X | | | | X | X | | 1.400 | | 29 |

FIG. 5

SPLIT POWER INFINITELY VARIABLE TRANSMISSION ARCHITECTURE INCORPORATING A PLANETARY TYPE BALL VARIATOR WITH MULTIPLE FIXED RANGES

CROSS-REFERENCE TO RELATED APPLICATION

Cross-reference is made to co-pending U.S. patent application Ser. No. 14/517,380, entitled "Split Power Infinitely Variable Transmission Architecture Incorporating a Planetary Type Ball Variator with Multiple Fixed Ranges," which was filed by Brian Schoolcraft and is incorporated herein by reference.

TECHNICAL FIELD

The present disclosure relates generally to infinitely variable transmissions, and more particularly, to the architectures of infinitely variable transmissions including ratio varying units.

BACKGROUND

Continuously variable transmissions (CVTs) utilize a ratio varying unit ("variator") to provide a continuous variation of transmission ratio rather than a series of predetermined ratios as provided in typical transmissions. The variator of a typical CVT is coupled between the transmission input and the transmission output via gearing and one or more clutches.

In one type of continuously variable transmission, commonly referred to as an infinitely variable transmission (IVT), a zero output speed can be obtained independently of the rotational input speed provided to the transmission by the drive unit in a geared neutral mode. Infinitely variable transmissions may use a variator and a planetary gear train to direct power flow along multiple power paths. For instance, power may flow along a first path through the variator and along a second path through the planetary gear train. Power may also be recirculated to the variator, thereby increasing the load experienced by the variator during the operation of the infinitely variable transmission. Many current architectures for infinitely variable transmissions subject the variator to the entire power load recirculated through the infinitely variable transmission.

SUMMARY

According to one aspect of the present disclosure, a transmission includes an input shaft, an output shaft, at least five planetary gearsets arranged between the input shaft and the output shaft, a variable-ratio unit arranged between the input shaft and the output shaft, and at least six clutches arranged between the input shaft and the output shaft. The input shaft is configured to receive torque from a drive unit. The output shaft is configured to transmit torque to a load. The at least six clutches are selectively engageable in combination with one another to select one of at least eight operating modes.

In some embodiments, (i) the at least five planetary gearsets may include only five planetary gearsets, and (ii) the at least six clutches may include only six clutches. In some embodiments, the at least eight operating modes may include only eight operating modes. The transmission may be operable to provide (i) a range of negative speed ratios between the input shaft and the output shaft in each of two reverse modes of the eight operating modes and (ii) a range of forward speed ratios between the input shaft and the output shaft in each of five forward modes of the eight operating modes. The transmission may be operable to engage at least two of the at least six clutches in each of (i) the two reverse modes and (ii) the five forward modes.

In some embodiments, (i) the transmission may be operable to receive a first plurality of input speeds at the input shaft and provide a second plurality of output speeds at the output shaft, and (ii) the at least eight operating modes may include a first mode in which one of the second plurality of output speeds is equal to zero for the first plurality of input speeds. The transmission may be operable to provide (i) a range of negative speed ratios between the input shaft and the output shaft in the first mode, and (ii) a range of forward speed ratios between the input shaft and the output shaft in the first mode.

In some embodiments, the at least eight operating modes may include at least fifteen operating modes. The at least fifteen operating modes may include seven transition modes in which the transmission is operable to provide a fixed speed ratio between the input shaft and the output shaft. The transmission may be operable to engage at least three of the at least six clutches in each of the seven transition modes.

According to another aspect of the present disclosure, a transmission includes a housing, an input shaft, an output shaft, a variable-ratio unit arranged between the input shaft and the output shaft, at least five planetary gearsets arranged between the input shaft and the output shaft, and at least six clutches arranged between the input shaft and the output shaft. The input shaft is configured to receive torque from a drive unit. The output shaft is configured to transmit torque to a load. The variable-ratio unit is configured to output torque from an input of the variable-ratio unit to an output of the variable-ratio unit. The at least five planetary gearsets include (i) a first planetary gearset coupled to the input shaft and the variable-ratio unit and (ii) a second planetary gearset coupled to the first planetary gearset, the variable-ratio unit, and the housing. The at least six clutches are selectively engageable in combination with one another to select one of at least eight operating modes.

In some embodiments, each of the first and second planetary gearsets may include an idler gear. In some embodiments, (i) a ring gear of the first planetary gearset may be coupled to the input shaft, and (ii) a carrier of the first planetary gearset may be coupled to the input of the variable-ratio unit. Additionally, in some embodiments, (i) a ring gear of the second planetary gearset may be coupled to a sun gear of the first planetary gearset, (ii) a sun gear of the second planetary gearset may be coupled to the output of the variable-ratio unit, and (iii) a carrier of the second planetary gearset may be coupled to the housing.

In some embodiments, (i) the at least five planetary gearsets may include a third planetary gearset coupled to the housing, and (ii) the at least six clutches may include a first clutch engageable to couple a carrier of the first planetary gearset to a carrier of the third planetary gearset. The at least six clutches may include a second clutch engageable to couple the carrier of the first planetary gearset to a sun gear of the third planetary gearset. The at least six clutches may include a third clutch engageable to couple a ring gear of the second planetary gearset to the carrier of the third planetary gearset. The at least six clutches may include a fourth clutch engageable to couple the ring gear of the second planetary gearset to the sun gear of the third planetary gearset. The transmission may be operable to (i) disengage one of the first clutch and the second clutch in each of the at least eight operating modes in which the other of the first clutch and the second clutch is engaged, and (ii) disengage one of the third clutch and the fourth clutch in each of the at least eight operating modes in which the other of the third clutch and the fourth clutch is engaged.

According to another aspect of the present disclosure, a transmission includes a housing, an input shaft, an output shaft, a variable-ratio unit arranged between the input shaft and the output shaft, at least five planetary gearsets arranged between the input shaft and the output shaft, and at least six clutches arranged between the input shaft and the output shaft. The input shaft is configured to receive torque from a drive unit. The output shaft is configured to transmit torque to a load. The at least five planetary gearsets include (i) a first planetary gearset coupled to the input shaft and the variable-ratio unit and (ii) a second planetary gearset coupled to the first planetary gearset, the variable-ratio unit, and the housing. The at least six clutches are selectively engageable in combination with one another to select one of at least eight operating modes. The at least six clutches include (i) a first pair of clutches being engageable in combination with one another to couple a first element of the second planetary gearset to a first element of the first planetary gearset in one of the at least eight operating modes and (ii) a second pair of clutches being engageable in combination with one another to couple the first element of the second planetary gearset to the first element of the first planetary gearset in another of the at least eight operating modes.

According to another aspect of the present disclosure, a transmission includes an input shaft, a plurality of planetary gearsets, a variable-ratio unit, and a plurality of torque-transmitting mechanisms. The input shaft is configured to receive torque from a drive unit and transmit the torque to an output shaft of the transmission. The plurality of planetary gearsets is arranged between the input shaft and the output shaft. Each of the plurality of planetary gearsets includes a ring gear, a sun gear, a carrier, and a plurality of planet gears. The plurality of planetary gearsets includes a first planetary gearset and a second planetary gearset. The variable-ratio unit is operable to produce continuously-variable torque output. The plurality of torque-transmitting mechanisms includes a first clutch and a second clutch. The first clutch is engageable to couple the ring gear of the first planetary gearset to the sun gear of the second planetary gearset. The second clutch is engageable to couple the ring gear of the first planetary gearset to the carrier of the second planetary gearset. The first clutch is engaged in a plurality of operating modes and the second clutch is disengaged in each one of the plurality of operating modes in which the first clutch is engaged.

In some embodiments, the second clutch may be engaged in a plurality of operating modes. The first clutch may be disengaged in each one of the plurality of operating modes in which the second clutch is engaged.

In some embodiments, the plurality of torque transmitting mechanisms may include a variator bypass clutch. The variator bypass clutch may be engageable to bypass the variable-ratio unit to prevent the variable-ratio unit from producing continuously-variable torque output. The variable-ratio unit may include an input ring and an output ring. The variator bypass clutch may be engageable to couple the input ring to the output ring to bypass the variable-ratio unit. The variator bypass clutch may be engageable to couple the input ring of the variable-ratio unit to the sun gear of the first planetary gearset.

In some embodiments, the plurality of planetary gearsets may include a third planetary gearset. The ring gear of the first planetary gearset may be coupled to the sun gear of the third planetary gearset. At least one of the first planetary gearset, the second planetary gearset, and the third planetary gearset may include at least one idler-planet gear. At least two of the first planetary gearset, the second planetary gearset, and the third planetary gearset may include at least one idler-planet gear.

According to another aspect of the present disclosure, a transmission includes an input shaft, a plurality of planetary gearsets, a variable-ratio unit, and a plurality of torque-transmitting mechanisms. The input shaft is configured to receive torque from a drive unit and transmit the torque to an output shaft of the transmission. The plurality of planetary gearsets is arranged between the input shaft and the output shaft. Each of the plurality of planetary gearsets includes a ring gear, a sun gear, a carrier, and a plurality of planet gears. The plurality of planetary gearsets includes a first planetary gearset, a second planetary gearset, and a third planetary gearset. The variable-ratio unit is operable to produce continuously-variable torque output. The plurality of torque transmitting mechanisms includes a first clutch, a second clutch, a third clutch, and a fourth clutch. The first clutch is engageable to couple the ring gear of the first planetary gearset to the sun gear of the third planetary gearset. The second clutch is engageable to couple the carrier of the second planetary gearset to the sun gear of the third planetary gearset. The third clutch is engageable to couple the ring gear of the first planetary gearset to the carrier of the third planetary gearset. The fourth clutch is engageable to couple the carrier of the second planetary gearset to the carrier of the third planetary gearset.

In some embodiments, the first clutch may be engaged in a plurality of operating modes. The third clutch may be disengaged in each one of the plurality of operating modes in which the first clutch is engaged. The third clutch may be engaged in a plurality of operating modes. The first clutch may be disengaged in each one of the plurality of operating modes in which the third clutch is engaged.

In some embodiments, the second clutch may be engaged in a plurality of operating modes. The fourth clutch may be disengaged in each one of the plurality of operating modes in which the second clutch is engaged. The fourth clutch may be engaged in a plurality of operating modes. The second clutch may be engaged in each one of the plurality of operating modes in which the fourth clutch is engaged.

In some embodiments, the plurality of planetary gearsets may include a fourth planetary gearset. The carrier of the third planetary gearset may be coupled to the carrier of the fourth planetary gearset. The fourth clutch may be engageable to couple the carrier of the second planetary gearset to the carrier of the fourth planetary gearset through the carrier of the third planetary gearset.

In some embodiments, each component of the second planetary gearset may be configured to rotate. Each component of the fourth planetary gearset may be configured to rotate.

In some embodiments, the transmission may include a transmission housing. The carrier of the first planetary gearset may be coupled to the transmission housing to brake the carrier of the first planetary gearset. The ring gear of the third planetary gearset may be coupled to the transmission housing to brake the ring gear of the third planetary gearset.

In some embodiments, the variable-ratio unit may be a planetary-type ball variator.

According to another aspect of the present disclosure, a transmission includes an input shaft, a plurality of planetary gearsets, a variable-ratio unit, and a plurality of torque-transmitting mechanisms. The input shaft is configured to receive torque from a drive unit and transmit the torque to an output shaft of the transmission. The plurality of planetary gearsets is arranged between the input shaft and the output shaft. Each of the plurality of planetary gearsets includes a ring gear, a sun gear, a carrier, and a plurality of planet gears. The plurality of planetary gearsets includes a first planetary gearset, a second planetary gearset, a third planetary gearset, a fourth planetary gearset, and a fifth planetary gearset. The variable-ratio unit is operable to produce continuously-variable torque output. The plurality of torque transmitting mechanisms includes a first clutch, a second clutch, a third clutch, a fourth clutch, and a fifth clutch. The first clutch is engageable to couple the ring gear of the first planetary gearset to the sun gear of the third planetary gearset. The second clutch is engageable to couple the carrier of the second planetary gearset to the sun gear of the third planetary gearset. The third clutch is engageable to couple the ring gear of the first planetary gearset to the carrier of the third planetary gearset. The fourth clutch is engageable to couple the carrier of the second planetary gearset to the carrier of the third planetary gearset. The fifth clutch is engageable to couple the carrier of the fourth planetary gearset to the output shaft through the ring gear of the fifth planetary gearset.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a table showing the various operating modes achievable by the infinitely variable transmission of FIG. 1 and the transmission ratios associated with each operating mode;

DETAILED DESCRIPTION OF THE DRAWINGS

Figure 1:
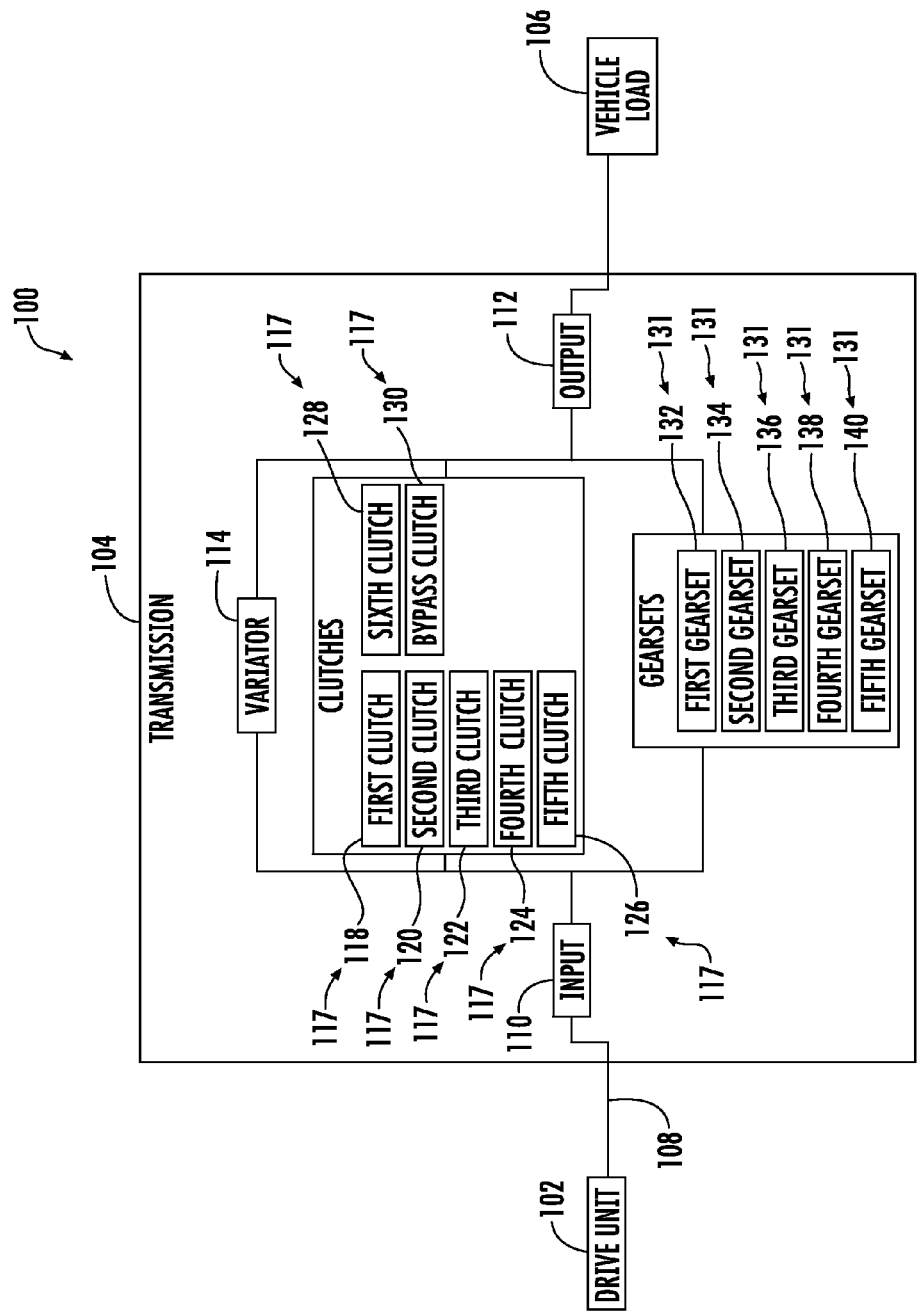
FIG. 1 is a simplified block diagram of an infinitely variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g. a transfer case or drop box) or a power take-off device, such as a pump, mixer, lifter, shoveler, compressor, compactor, or blower.

In use, rotational power generated by the drive unit 102 is transmitted to the transmission 104 via a drive unit output shaft 108, included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed in more detail below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which the variator 114 is utilized enable a range of transmission ratios to be achieved whereas operating modes in which the variator 114 is not utilized enable only a single transmission ratio to be achieved.

The transmission 104 of FIG. 1 is illustratively embodied as an infinitely variable transmission. The transmission 104 includes the variator 114, a plurality of clutches 117, and a plurality of gearsets 131 in addition to the input shaft 110 and the output shaft 112. Illustratively, the plurality of clutches 117 includes a first clutch 118, a second clutch 120, a third clutch 122, a fourth clutch 124, a fifth clutch 126, a sixth clutch 128, and a variator bypass clutch 130. Additionally, the illustrative plurality of gearsets 131 includes a first gearset 132, a second gearset 134, a third gearset 136, a fourth gearset 138, and a fifth gearset 140.

The infinitely variable transmission 104 is operable, as discussed below, to transmit rotational power supplied from the drive unit 102 between the variator 114 and the plurality of gearsets 131. The transmission 104 is also operable, in one operating mode, to achieve zero output speed at the output shaft 112 in a mode herein referred to as a "geared neutral mode." The transmission 104 is further operable to recirculate rotational power directed toward the output shaft 112 back toward the input shaft 110 in multiple operating modes. As discussed below, power recirculated back toward the input shaft 110 and received by the variator 114 is reduced as a result of the architecture of the infinitely variable transmission 104. In this manner, the infinitely variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 117, and the plurality of gearsets 131 included in the transmission 104 are arranged between the input shaft 110 and the output shaft 112 of the transmission 104. Each of the gearsets included in the plurality of gearsets 131 may be supported by a mainshaft of the transmission 104 and may be capable of rotating freely and independently thereof. Each of the clutches may be selectively engaged to transmit power along a particular path between components of the transmission 104 as discussed below.

Each of the plurality of clutches 117 included in the transmission 104 is embodied as a torque-transmitting device configured to define a torque transfer path between components included in the transmission 104. By selectively engaging each of the plurality of clutches 117 in combination with one another, the plurality of clutches 117 define a torque transfer path between the input shaft 110 and the output shaft 112 and thereby effect a change from one operating mode to another. In one example, one or more of the plurality of clutches 117 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches may be embodied as a multi-plate wet clutches or controllable mechanical diodes, the engagement/disengagement of which are used to accomplish changes between operating modes. As discussed below, in the illustrative embodiment, the second clutch 120, the third clutch 122, the fourth clutch 124, the fifth clutch 126, the sixth clutch 128, and the variator bypass clutch 130 are rotating clutches while the first clutch 118 is a stationary, non-rotating clutch. Additionally, the variator bypass clutch 130, as discussed below, is engageable to lock a variator input ring 142 to a variator output ring 146 so that the variator 114 achieves a 1:1 ratio (i.e., variator input speed is equal to variator output speed). When the variator bypass clutch 130 is engaged, the power load experienced by the variator 114 is removed, and all the power transmitted to the variator 114 flows instead through the variator bypass clutch 130.

Figure 2:
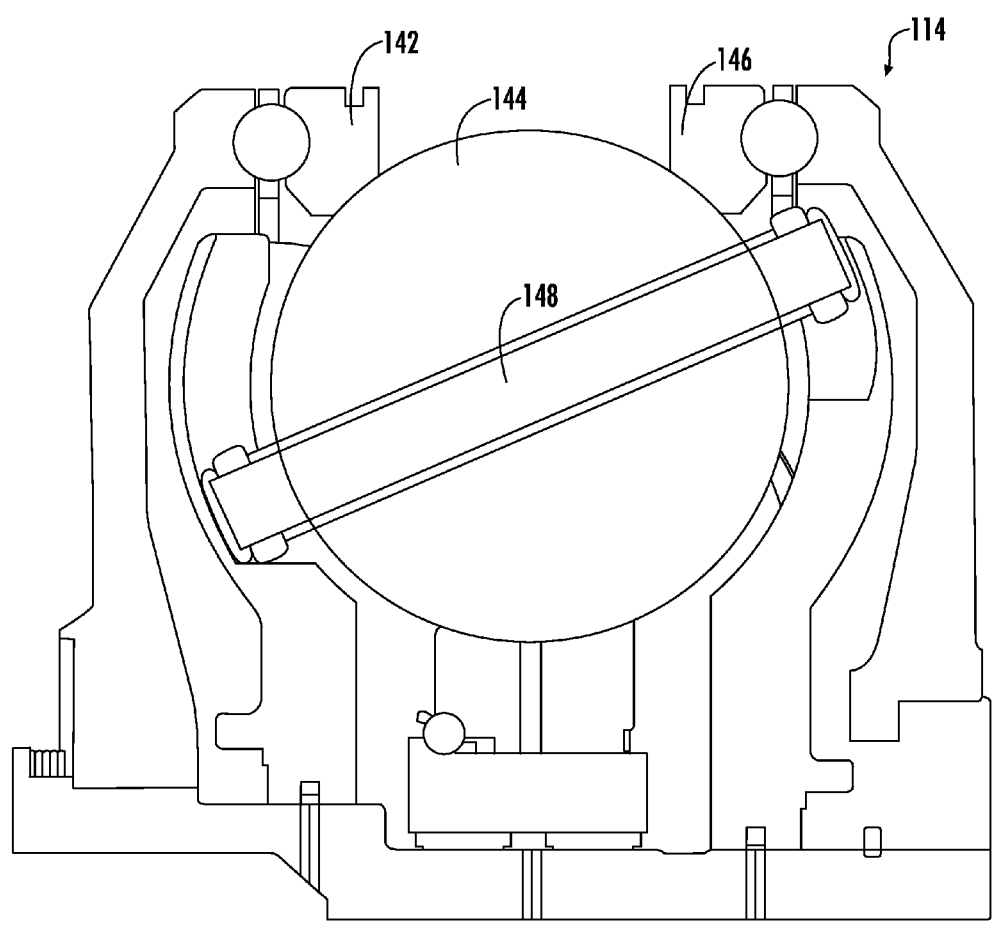
FIG. 2 is a side elevation view of the variator of the infinitely variable transmission of FIG. 1.

Referring now to FIG. 2, in the illustrative embodiment, the variator 114 is embodied as a planetary-type ball variator and includes the input ring 142 and the output ring 146. The variator rings 142, 146 are spaced apart as shown in FIG. 2 to permit a ball 144 to be positioned between the rings 142, 146. The ball 144 is configured to tilt between the rings 142, 146 to vary the ratio achieved using the variator 114. An axle 148 encircles the ball 144 as shown in FIG. 2. The ball 144 is tilted by continuously tilting the axle 148 so that continuously-variable torque output is produced using the variator 114.

Figure 3:
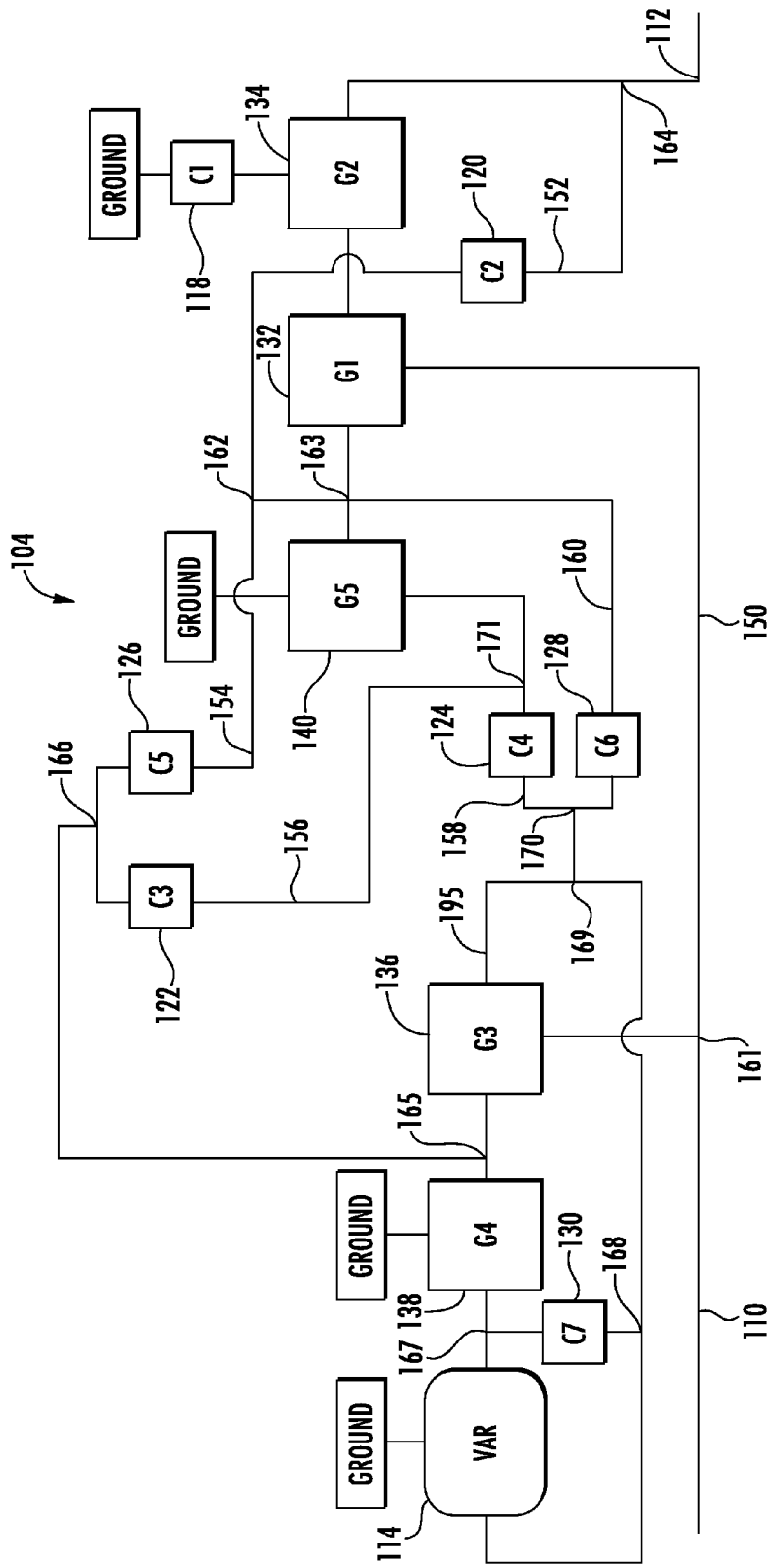
FIG. 3 is a block diagrammatic view of the architecture of the infinitely variable transmission of FIG. 1 showing various components included in the infinitely variable transmission.

Referring now to FIG. 3, the architecture of the transmission 104 is shown in which each gearset of the plurality of gearsets 131 is represented by a corresponding box (i.e. G1, G2, G3, G4, and G5) and the variator 114 is designated as "VAR." G1 designates the first gearset 132, G2 designates the second gearset 134, G3 designates the third gearset 136, G4 designates the fourth gearset 138, and G5 designates the fifth gearset 140. Each clutch of the plurality of clutches 117 is also represented by a box such that the following designations apply: C1 (the first clutch 118), C2 (the second clutch 120), C3 (the third clutch 122), C4 (the fourth clutch 124), C5 (the fifth clutch 126), C6 (the sixth clutch 128), and C7 (the variator bypass clutch 130).

It should be appreciated that the architecture of the transmission 104 defines a plurality of power paths along which power is transmitted between components included in the transmission 104 during one or more operational modes. The plurality of power paths include a power path 150 used in combination with one or more of a power path 154, a power path 156, a power path 158, and a power path 160 to transmit power from the input shaft 110 to the output shaft 112. The plurality of power paths also includes a power path 152 used in combination with one or more of the power path 150, the power path 154, the power path 156, the power path 158, and the power path 160 to transmit power from the input shaft 110 to the output shaft 112. In each operating mode of the transmission 104, power is transmitted between the input shaft 110 and the output shaft 112 along at least one of the power paths 150, 152 and at least one of the power paths 154, 156, 158, 160.

The power path 150 is illustratively defined by a junction 161, a junction 162, a junction 163, the first gearset 132, the second gearset 134, the first clutch 118, and a junction 164. Power may be transmitted along the power path 150 from the junction 161 to the first gearset 132 and thereafter to the second gearset 134 as shown, for example, in FIG. 13. Power may also be transmitted from the junction 161 to the first gearset 132 along one of the power paths 154, 156, 158, 160 as shown, for example, in FIG. 6. Power transmitted to the second gearset 134 is transmitted therefrom to the junction 164 and to the output shaft 112 as shown, for example, in FIG. 6. Power transmitted to the first gearset 132 may be recirculated toward the input shaft 110 along one of the power paths 154, 156, 158, 160 as shown, for example, in FIG. 13. Power transmitted to the first gearset 132 may also be recirculated toward the input shaft 110 along the power path 150 as shown, for example, in FIG. 6.

As illustrated in FIGS. 6-29, the first gearset 132 is a "mixing" planetary gearset that allows power transmitted thereto to be transmitted to the second gearset 134 along the power path 150, recirculated back toward the input shaft 110 along one or more of the power paths 154, 156, 158, 160 and the power path 150, and split so that power transmitted to the first gearset 132 is transmitted along the power paths 150, 152 to the output shaft 112. Each component of the first gearset 132 (i.e., each of a sun gear, a carrier, a ring gear, and a plurality of planet gears included in the first gearset 132 as described in more detail below) rotates and is configured to transmit power (i.e., no component of the first gearset 132 is grounded or braked).

The power path 150 utilizes a "fixed" and a "variable" sub-path to transmit power between the input shaft 110 and the output shaft 112. Power is transmitted along the "fixed" sub-path at a fixed mechanical ratio. Conversely, power is transmitted along the "variable" sub-path over a continuously-variable ratio range, i.e., embodied as power that is transmitted through the variator 114. Each of the power paths 154, 156, 158, 160 utilizes a "fixed" and a "variable" sub-path similar to the power path 150. The "fixed" and "variable" sub-paths of the power path 150 and the power paths 154, 156, 158, 160 are described in more detail below.

The "fixed" sub-path of the power path 150 corresponds to power flowing from the junction 161 to the first gearset 132 and therefrom to the output shaft 112 through the second gearset 134 and the junction 164. The "variable" sub-path of the power path 150 may correspond to power flowing from the first gearset 132 to the junction 163 and thereafter through the variator 114 along one of the power paths 154, 156, 158, 160.

The power path 154 is illustratively defined by the third gearset 136, a junction 165, the fourth gearset 138, a junction 167, the variator 114, the variator bypass clutch 130, a junction 168, a junction 169, a junction 166, the fifth clutch 126, the junction 162, and the junction 163. As indicated above, the power path 154 utilizes a "fixed" and a "variable" sub-path to transmit power between components of the transmission 104. The "fixed" sub-path of the power path 154 corresponds to power flowing through the junctions 165, 166, 162, 163 when the fifth clutch 126 is engaged and the variator bypass clutch 130 is engaged. The "variable" sub-path of the power path 154 corresponds to power flowing between the junctions 165, 169 (i.e., through the variator 114 and the fourth gearset 138) when the fifth clutch 126 is engaged and the variator bypass clutch 130 is disengaged.

The power path 156 is illustratively defined by the third gearset 136, the junction 165, the fourth gearset 138, the junction 167, the variator 114, the variator bypass clutch 130, the junction 168, the junction 169, the junction 166, the third clutch 122, a junction 171, the fifth gearset 140, and the junction 163. As indicated above, the power path 156 utilizes a "fixed" and a "variable" sub-path to transmit power between components of the transmission 104. The "fixed" sub-path of the power path 156 corresponds to power flowing through the junctions 165, 166, 171, 163 when the third clutch 122 is engaged and the variator bypass clutch 130 is engaged. The "variable" sub-path of the power path 156 corresponds to power flowing between the junctions 165, 169 (i.e., through the variator 114 and the fourth gearset 138) when the third clutch 122 is engaged and the variator bypass clutch 130 is disengaged.

The power path 158 is illustratively defined by the third gearset 136, the junction 165, the fourth gearset 138, the junction 167, the variator 114, the variator bypass clutch 130, the junction 168, the junction 169, a junction 170, the fourth clutch 124, the junction 171, the fifth gearset 140, and the junction 163. As indicated above, the power path 158 utilizes a "fixed" and a "variable" sub-path to transmit power between components of the transmission 104. The "fixed" sub-path of the power path 158 corresponds to power flowing through the junctions 169, 170, 171, 163 when the fourth clutch 124 is engaged and the variator bypass clutch 130 is engaged. The "variable" sub-path of the power path 158 corresponds to power flowing between the junctions 165, 169 (i.e., through the variator 114 and the fourth gearset 138) when the fourth clutch 124 is engaged and the variator bypass clutch 130 is disengaged.

The power path 160 is illustratively defined by the third gearset 136, the junction 165, the fourth gearset 138, the junction 167, the variator 114, the variator bypass clutch 130, the junction 168, the junction 169, the junction 170, the sixth clutch 128, and the junction 163. As indicated above, the power path 160 utilizes a "fixed" sub-path and a "variable" sub-path to transmit power between components of the transmission 104. The "fixed" sub-path of the power path 160 corresponds to power flowing between the junctions 169, 170, 163 when the sixth clutch 128 is engaged and the variator bypass clutch 130 is engaged. The "variable" sub-path of the power path 160 corresponds to power flowing between the junctions 165, 169 (i.e., through the variator 114 and the fourth gearset 138) when the sixth clutch 128 is engaged and the variator bypass clutch 130 is disengaged.

The power path 152 is illustratively defined by the junction 163, the second clutch 120, and the junction 164. It should be appreciated that the power path 152 is "direct" in that power transmitted along the power path 152 is not split or recirculated as shown in FIGS. 6-29. The power path 152 utilizes only a "fixed" portion to transmit power between the input shaft 110 and the output shaft 112.

Power transmitted along each of the power paths 154, 156, 158, 160 flows through the third gearset 136. Similar to the first gearset 132, the third gearset 136 is a "mixing" planetary gearset that allows power transmitted thereto to be transmitted along one or more of the power paths 154, 156, 158, 160, reconstituted (i.e., a power flow previously split into two parts is reconstituted when the two parts combine at the third gearset 136), recirculated back toward the junction 161, and split so that one portion of the power transmitted to the third gearset 136 is circulated along one of the power paths 154, 156, 158, 160 and another portion of the power transmitted to the third gearset 136 is circulated along another of the power paths 154, 156, 158, 160 as shown in FIGS. 6-29. Each component of the third gearset 136 (i.e., a sun gear, a carrier, a ring gear, and a plurality of planet gears of the third gearset 136 as described in more detail below) rotates and is configured to transmit power (i.e., no component of the third gearset 136 is grounded or braked).

Figure 4:
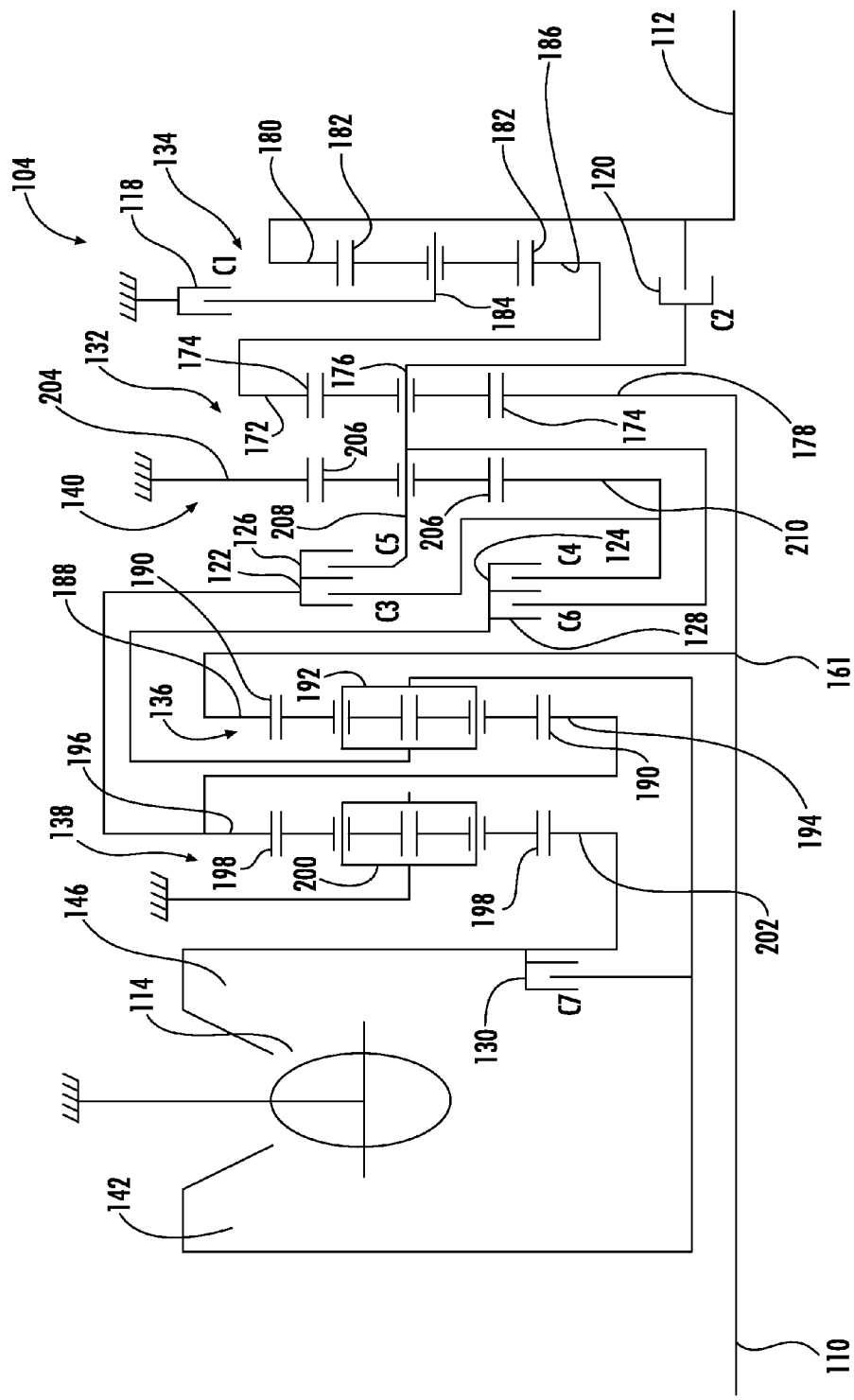
FIG. 4 is a schematic of the architecture of FIG. 3 and the associated transmission components showing the interconnections between the components.

Referring now to FIG. 4, the variator 114, the plurality of gearsets 131, and the plurality of clutches 117 are physically arranged between the input shaft 110 and the output shaft 112. In the illustrative physical arrangement of the transmission 104, the variator 114 is positioned in front of the plurality of clutches 117 and the plurality of gearsets 131 relative to the input shaft 110 as shown in FIG. 4.

The first gearset 132 of the plurality of gearsets 131 is configured to receive power from the input shaft 110 that is transmitted to the junction 161 and thereafter to the first gearset 132 as shown in FIG. 4. The first gearset 132 is illustratively a simple planetary gearset that includes a ring gear 172, a plurality of planet gears 174, a carrier 176, and a sun gear 178. Each of the planet gears 174 is intermeshed with the ring gear 172 and the sun gear 178, and each of the planet gears 174 is supported for rotation by the carrier 176. Power from the input shaft 110 is transmitted to the junction 161 and therefrom to the sun gear 178. The ring gear 172 is coupled to the second gearset 134, and the second clutch 120 is engageable to couple the carrier 176 to the second gearset 134 so that the carrier 176 is coupled to the output shaft 112 (i.e., the second clutch 120 is engageable to couple the carrier 176 to the output shaft 112 through the second gearset 134). The carrier 176 is coupled to the fifth gearset 140, and the sixth clutch 128 is engageable to couple the carrier 176 to the third gearset 136.

The second gearset 134 of the plurality of gearsets 131 is configured to receive power from the input shaft 110 that is transmitted to the first gearset 132 and therefrom to the second gearset 134. The second gearset 134 is illustratively a simple planetary gearset that includes a ring gear 180, a plurality of planet gears 182, a carrier 184, and a sun gear 186. Each of the planet gears 182 is intermeshed with the ring gear 180 and the sun gear 186, and each of the planet gears 182 is supported for rotation by the carrier 184. The first clutch 118 is engageable to couple the carrier 184 to a stationary, non-rotating part of the transmission 104 to prevent the carrier 184 from rotating (i.e., braking the carrier 184). For instance, the first clutch 118 may be engageable to couple the carrier 184 to a transmission housing of the transmission 104. The sun gear 186 is coupled to the ring gear 172 of the first gearset 132, and the ring gear 180 is coupled to the output shaft 112. The second clutch 120 is engageable to couple the ring gear 180 to the carrier 176 of the first gearset 132 so that the carrier 176 is coupled to the output shaft 112 through the ring gear 180.

The third gearset 136 of the plurality of gearsets 131 is configured to receive power from the input shaft 110 that is transmitted to the junction 161 and thereafter to the third gearset 136. The third gearset 136 is illustratively an idler-planet planetary gearset that includes a ring gear 188, a plurality of planet gears 190 including one or more idler-planet gears, a carrier 192, and a sun gear 194. Each of the planet gears 190 is intermeshed with either the ring gear 188 or the sun gear 194 and another one of the planet gears 190, and each of the planet gears 190 is supported for rotation by the carrier 192. Power from the input shaft 110 is transmitted to the junction 161 and therefrom to ring gear 188. The sun gear 194 is coupled to the fourth gearset 138. The carrier 192 is coupled to the input ring 142 of the variator 114, and the variator bypass clutch 130 is engageable to couple the carrier 192 to the output ring 146 of the variator 114. The fourth clutch 124 is engageable to couple the carrier 192 to the fifth gearset 140, and the sixth clutch 128 is engageable to couple the carrier 192 to (i) the fifth gearset 140 and (ii) the carrier 176 of the first gearset 132.

The fourth gearset 138 of the plurality of gearsets 131 is configured to receive power from the input shaft 110 that is transmitted thereto from the third gearset 136. The fourth gearset 138 is illustratively an idler-planet planetary gearset that includes a ring gear 196, a plurality of planet gears 198 including one or more idler-planet gears, a carrier 200, and a sun gear 202. Each of the planet gears 198 is intermeshed with either the ring gear 196 or the sun gear 202 and one of the planet gears 198, and each of the planet gears 198 is supported for rotation by the carrier 200. The carrier 200 is coupled to a stationary, non-rotating part of the transmission 104 which prevents the carrier 200 from rotating. For instance, the carrier 200 may be coupled to the housing of the transmission 104. The sun gear 202 is coupled to the output ring 146 of the variator 114, and the variator bypass clutch 130 is engageable to couple the sun gear 202 to the carrier 192 of the third gearset 136. The ring gear 196 is coupled to the sun gear 194 of the third gearset 136. The third clutch 122 is engageable to couple the ring gear 196 to the fifth gearset 140, and the fifth clutch 126 is engageable to couple the ring gear 196 to the fifth gearset 140.

The fifth gearset 140 of the plurality of gearsets 131 is configured to receive power from the input shaft 110 that is transmitted thereto from at least one of the first, second, third, and fourth gearsets 132, 134, 136, 138. The fifth gearset 140 is illustratively a simple planetary gearset that includes a ring gear 204, a plurality of planet gears 206, a carrier 208, and a sun gear 210. Each of the planet gears 206 is intermeshed with the ring gear 204 and the sun gear 210, and each of the planet gears 206 is supported for rotation by the carrier 208. The ring gear 204 is coupled to a stationary, non-rotating part of the transmission 104 to prevent the ring gear 204 from rotating (i.e., braking the ring gear 204). For instance, the ring gear 204 may be coupled to the housing of the transmission 104. The third clutch 122 is engageable to couple the sun gear 210 to the ring gear 196 of the fourth gearset 138. The fourth clutch 124 is engageable to couple the sun gear 210 to the carrier 192 of the third gearset 136. The carrier 208 is coupled to the carrier 176 of the first gearset 132. The fifth clutch 126 is engageable to couple the carrier 208 to the ring gear 196 of the fourth gearset 138. The sixth clutch 128 is engageable to couple the carrier 208 to the carrier 192 of the third gearset 136.

A power take-off device (not shown) may be coupled to the variator 114 to transmit power from the drive unit 102 to the variator 114 and therefrom to the power-take off device. For instance, the power take-off device may be coupled to the input ring 142 of the variator 114. Alternatively, the power take-off device may be coupled to the output ring 146 of the variator 114. When the transmission 104 is placed in a neutral range, the variator 114 may be used to continuously vary the ratio of the power-take off device relative to the rotational speed of the drive unit output shaft 108 and the transmission input shaft 110.

Referring now to FIG. 5, a table 212 illustrates the various operating modes of the transmission 104, the clutches applied in each mode, the transmission ratio(s) achieved in each mode, and the figures in which the operating modes are shown. The transmission 104 is operable in eight operating modes to achieve a variable transmission ratio within a defined transmission ratio range. In all other operating modes, as discussed below, the transmission 104 achieves a single transmission ratio.

The transmission 104 is operable in a first reverse operating mode (i.e., "Mode 1"), when the first clutch 118 and the sixth clutch 128 are contemporaneously engaged as shown in FIG. 5, to achieve a variable transmission ratio within the range of −1.000 (minimum) to −0.425 (maximum). As suggested above, the variable transmission ratio is achievable in "Mode 1" as a result of utilizing the variator 114. The "Mode 1" operating mode covers a reverse ratio range.

The transmission 104 is operable in a first reverse variator bypass operating mode (i.e., "Bypass 1"), when the first clutch 118, the sixth clutch 128, and the variator bypass clutch 130 are contemporaneously engaged as shown in FIG. 5, to achieve a fixed transmission ratio of −0.712. Because the variator 114 is bypassed in the "Bypass 1" mode, only a single fixed transmission ratio is achieved by the transmission 104 in that mode. The "Bypass 1" operating mode covers a reverse ratio.

The transmission 104 is operable in a first reverse synchronous operating mode (i.e., "Sync 1-2"), when the first clutch 118, the fifth clutch 126, and the sixth clutch 128 are contemporaneously engaged as shown in FIG. 5, to achieve a fixed transmission ratio of −0.425. The ratio of −0.425 coincides with the maximum ratio achieved in the "Mode 1" operating mode and the minimum ratio achieved in the "Mode 2" operating mode (discussed below) so that the "Sync 1-2" operating mode effects a transition (i.e., a synchronous shift) between those two modes. A single fixed transmission ratio is achieved by the transmission 104 in the "Sync 1-2" mode because the variator 114 is effectively bypassed. The "Sync 1-2" operating mode covers another reverse ratio.

The transmission 104 is operable in a second reverse operating mode (i.e., "Mode 2"), when the first clutch 118 and the fifth clutch 126 are contemporaneously engaged as shown in FIG. 5, to achieve a variable transmission ratio within the range of −0.425 (minimum) to −0.105 (maximum). The variable transmission ratio is achievable in "Mode 2" as a result of utilizing the variator 114. The "Mode 2" operating mode covers another reverse ratio range.

The transmission 104 is operable in a second reverse variator bypass operating mode (i.e., "Bypass 2"), when the first clutch 118, the fifth clutch 126, and the variator bypass clutch 130 are contemporaneously engaged as shown in FIG. 5, to achieve a fixed transmission ratio of −0.265. Because the variator 114 is bypassed in the "Bypass 2" mode, only a single fixed transmission ratio is achieved by the transmission 104 in that mode. The "Bypass 2" operating mode covers another reverse ratio.

The transmission 104 is operable in a second reverse synchronous operating mode (i.e., "Sync 2-3"), when the first clutch 118, the fourth clutch 124, and the fifth clutch 126 are contemporaneously engaged as shown in FIG. 5, to achieve a fixed transmission ratio of −0.105. The ratio of −0.105 coincides with the maximum ratio achieved in the "Mode 2" operating mode and the minimum ratio achieved in the "Mode 3" operating mode (discussed below) so that the "Sync 2-3" operating mode effects a transition (i.e. a synchronous shift) between those two modes. A single fixed transmission ratio is achieved by the transmission 104 in the "Sync 2-3" mode because the variator 114 is effectively bypassed. The "Sync 2-3" operating mode covers another reverse ratio.

The transmission 104 is operable in a reverse ratio range of a third operating mode (i.e., "Mode 3"), when the first clutch 118 and the fourth clutch 124 are contemporaneously engaged as shown in FIG. 5, to achieve a variable transmission ratio within the range of −0.105 (minimum) to 0.000. The variable transmission ratio is achievable in "Mode 3" as a result of utilizing the variator 114. The "Mode 3" operating mode provides the geared neutral mode of the transmission 104 (i.e., a ratio of 0.000 is covered by "Mode 3").

The transmission 104 is operable in a forward ratio range of the third operating mode (i.e., "Mode 3"), when the first clutch 118 and the fourth clutch 124 are contemporaneously engaged as indicated above, to achieve a variable transmission ratio within the range of 0.000 to 0.073 (maximum). The variable transmission ratio is achievable in "Mode 3" as a result of utilizing the variator 114.

The transmission 104 is operable in a third reverse variator bypass operating mode (i.e., "Bypass 3"), when the first clutch 118, the fourth clutch 124, and the variator bypass clutch 130 are contemporaneously engaged as shown in FIG. 5, to achieve a fixed transmission ratio of −0.016. Because the variator 114 is bypassed in the "Bypass 3" mode, only a single fixed transmission ratio is achieved by the transmission 104. The "Bypass 3" operating mode covers another reverse ratio.

The transmission 104 is operable in a third forward synchronous operating mode (i.e., "Sync 3-4"), when the first clutch 118, the third clutch 122, and the fourth clutch 124 are contemporaneously engaged as shown in FIG. 5, to achieve a fixed transmission ratio of 0.073. The ratio of 0.073 coincides with the maximum ratio achieved in the "Mode 3" operating mode and the minimum ratio achieved in the "Mode 4" operating mode (discussed below) so that the "Sync 3-4" operating mode effects a transition (i.e. a synchronous shift) between those two modes. A single fixed transmission ratio is achieved by the transmission 104 in the "Sync 3-4" mode because the variator 114 is effectively bypassed. The "Sync 3-4" operating mode covers a forward ratio.

The transmission 104 is operable in a fourth forward operating mode (i.e., "Mode 4"), when the first clutch 118 and the third clutch 122 are contemporaneously engaged as shown in FIG. 5, to achieve a variable transmission ratio within the range of 0.073 (minimum) to 0.171 (maximum). The variable transmission ratio is achievable in "Mode 4" as a result of utilizing the variator 114. The "Mode 4" operating mode covers another forward ratio range.

The transmission 104 is operable in a fourth forward variator bypass operating mode (i.e., "Bypass 4"), when the first clutch 118, the third clutch 122, and the variator bypass clutch 130 are contemporaneously engaged as shown in FIG. 5, to achieve a fixed transmission ratio of 0.122. Because the variator 114 is bypassed in the "Bypass 4" mode, only a single fixed transmission ratio is achieved by the transmission 104. The "Bypass 4" operating mode covers another forward ratio.

The transmission 104 is operable in a fourth forward synchronous operating mode (i.e., "Sync 4-5"), when the first clutch 118, the second clutch 120, and the third clutch 122 are contemporaneously engaged as shown in FIG. 5, to achieve a fixed transmission ratio of 0.171. The ratio of 0.171 coincides with the maximum ratio achieved in the "Mode 4" operating mode and the minimum ratio achieved in the "Mode 5" operating mode (discussed below) so that the "Sync 3-4" operating mode effects a transition (i.e. a synchronous shift) between those two modes. A single fixed transmission ratio is achieved by the transmission 104 in the "Sync 4-5" mode because the variator 114 is effectively bypassed. The "Sync 4-5" operating mode covers another forward ratio.

The transmission 104 is operable in a fifth forward operating mode (i.e., "Mode 5"), when the second clutch 120 and the third clutch 122 are contemporaneously engaged as shown in FIG. 5, to achieve a variable transmission ratio within the range of 0.171 (minimum) to 0.309 (maximum). The variable transmission ratio is achievable in "Mode 5" as a result of utilizing the variator 114. The "Mode 5" operating mode covers another forward ratio range.

The transmission 104 is operable in a fifth forward variator bypass operating mode (i.e., "Bypass 5"), when the second clutch 120, the third clutch 122, and the variator bypass clutch 130 are contemporaneously engaged as shown in FIG. 5, to achieve a fixed transmission ratio of 0.240. Because the variator 114 is bypassed in the "Bypass 5" mode, only a single fixed transmission ratio is achieved by the transmission 104. The "Bypass 5" operating mode covers another forward ratio.

The transmission 104 is operable in a fifth forward synchronous operating mode (i.e., "Sync 5-6"), when the second clutch 120, the third clutch 122, and the fourth clutch 124 are contemporaneously engaged as shown in FIG. 5, to achieve a fixed transmission ratio of 0.309. The ratio of 0.309 coincides with the maximum ratio achieved in the "Mode 5" operating mode and the minimum ratio achieved in the "Mode 6" operating mode (discussed below) so that the "Sync 5-6" operating mode effects a transition (i.e. a synchronous shift) between those two modes. A single fixed transmission ratio is achieved by the transmission 104 in the "Sync 5-6" mode because the variator 114 is effectively bypassed. The "Sync 5-6" operating mode covers another forward ratio.

The transmission 104 is operable in a sixth forward operating mode (i.e., "Mode 6"), when the second clutch 120 and the fourth clutch 124 are contemporaneously engaged as shown in FIG. 5, to achieve a variable transmission ratio within the range of 0.309 (minimum) to 0.556 (maximum). The variable transmission ratio is achievable in "Mode 6" as a result of utilizing the variator 114. The "Mode 6" operating mode covers another forward ratio range.

The transmission 104 is operable in a sixth forward variator bypass operating mode (i.e., "Bypass 6"), when the second clutch 120, the fourth clutch 124, and the variator bypass clutch 130 are contemporaneously engaged as shown in FIG. 5, to achieve a fixed transmission ratio of 0.432. Because the variator 114 is bypassed in the "Bypass 6" mode, only a single fixed transmission ratio is achieved by the transmission 104. The "Bypass 6" operating mode covers another forward ratio.

The transmission 104 is operable in a sixth forward synchronous operating mode (i.e., "Sync 6-7"), when the second clutch 120, the fourth clutch 124, and the fifth clutch 126 are contemporaneously engaged as shown in FIG. 5, to achieve a fixed transmission ratio of 0.556. The ratio of 0.556 coincides with the maximum ratio achieved in the "Mode 6" operating mode and the minimum ratio achieved in the "Mode 7" operating mode (discussed below) so that the "Sync 6-7" operating mode effects a transition (i.e. a synchronous shift) between those two modes. A single fixed transmission ratio is achieved by the transmission 104 in the "Sync 6-7" mode because the variator 114 is effectively bypassed. The "Sync 6-7" operating mode covers another forward ratio.

The transmission 104 is operable in a seventh forward operating mode (i.e., "Mode 7"), when the second clutch 120 and the fifth clutch 126 are contemporaneously engaged as shown in FIG. 5, to achieve a variable transmission ratio within the range of 0.556 (minimum) to 1.000 (maximum). The variable transmission ratio is achievable in "Mode 7" as a result of utilizing the variator 114. The "Mode 7" operating mode covers another forward ratio range.

The transmission 104 is operable in a seventh forward variator bypass operating mode (i.e., "Bypass 7"), when the second clutch 120, the fifth clutch 126, and the variator bypass clutch 130 are contemporaneously engaged as shown in FIG. 5, to achieve a fixed transmission ratio of 0.778. Because the variator 114 is bypassed in the "Bypass 7" mode, only a single fixed transmission ratio is achieved by the transmission 104. The "Bypass 7" operating mode covers another forward range.

The transmission 104 is operable in a seventh forward synchronous operating mode (i.e., "Sync 7-8"), when the second clutch 120, the fifth clutch 126, and the sixth clutch 128 are contemporaneously engaged as shown in FIG. 5, to achieve a fixed transmission ratio of 1.000. The ratio of 1.000 coincides with the maximum ratio achieved in the "Mode 7" operating mode and the minimum ratio achieved in the "Mode 8" operating mode (discussed below) so that the "Sync 7-8" operating mode effects a transition (i.e. a synchronous shift) between those two modes. A single fixed transmission ratio is achieved by the transmission 104 in the "Sync 7-8" mode because the variator 114 is effectively bypassed. The "Sync 7-8" operating mode covers another forward ratio.

The transmission 104 is operable in an eighth forward operating mode (i.e., "Mode 8"), when the second clutch 120 and the sixth clutch 128 are contemporaneously engaged as shown in FIG. 5, to achieve a variable transmission ratio within the range of 1.000 (minimum) to 1.800 (maximum). The variable transmission ratio is achievable in "Mode 8" as a result of utilizing the variator 114. The "Mode 8" operating mode covers another forward ratio range.

The transmission 104 is operable in an eighth forward variator bypass operating mode (i.e., "Bypass 8"), when the second clutch 120, the sixth clutch 128, and the variator bypass clutch 130 are contemporaneously engaged as shown in FIG. 5, to achieve a fixed transmission ratio of 1.400. Because the variator 114 is bypassed in the "Bypass 8" mode, only a single fixed transmission ratio is achieved by the transmission 104. The "Bypass 8" operating mode covers another forward ratio.

As shown in table 212 of FIG. 5, the fifth clutch 126 is disengaged in each operating mode in which the third clutch 122 is engaged, and the third clutch 122 is disengaged in each operating mode in which the fifth clutch 126 is engaged. Additionally, the sixth clutch 128 is disengaged in each operating mode in which the fourth clutch 124 is engaged, and the fourth clutch 124 is disengaged in each operating mode in which the sixth clutch 128 is engaged as shown in FIG. 5.

Figure 6:
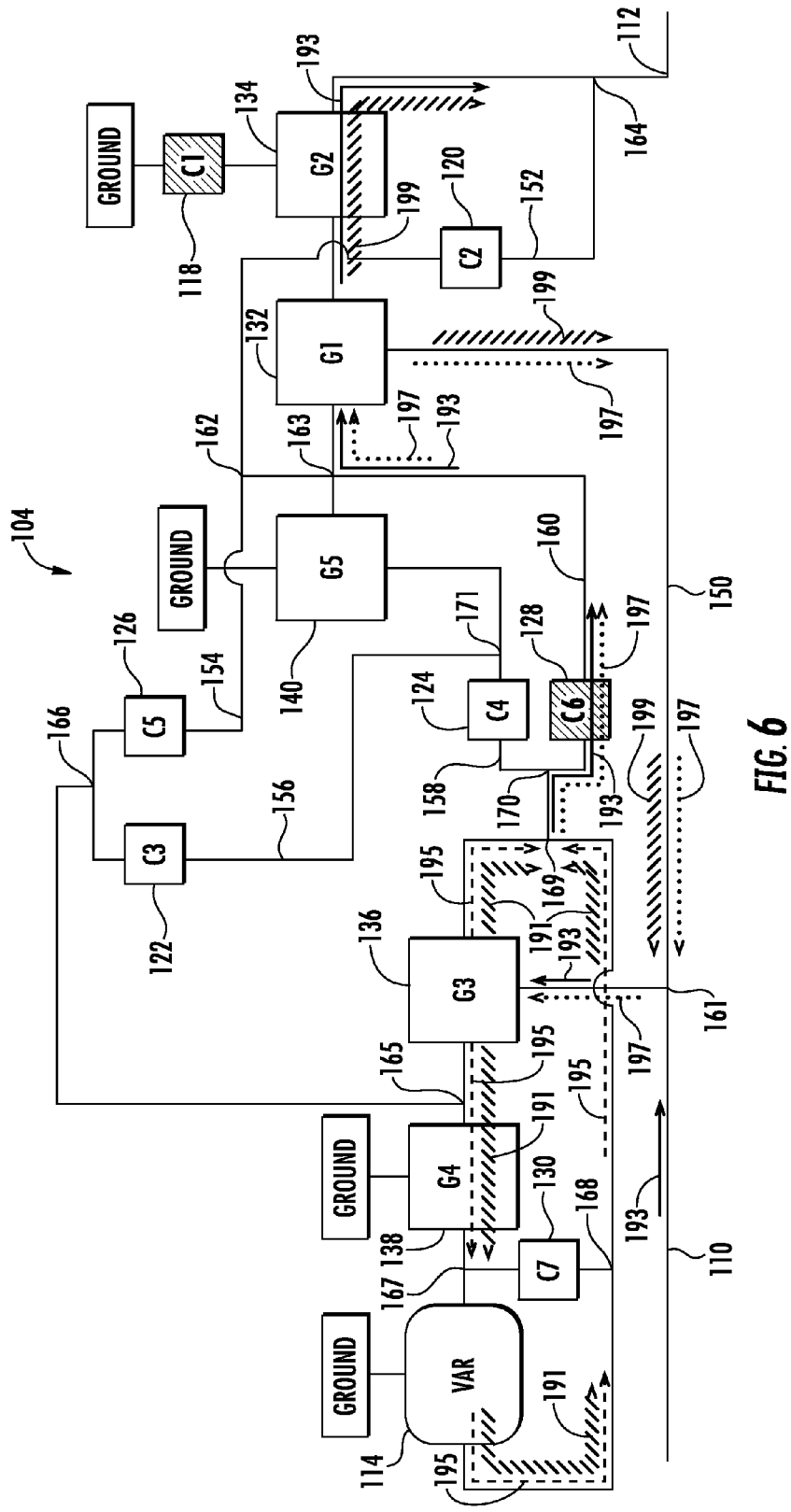
FIG. 6 is a block diagrammatic view of the infinitely variable transmission of FIG. 3 showing power flow therethrough in a first reverse operating mode.

Referring now to FIGS. 6-29, power flow from the input shaft 110 to the output shaft 112 of the transmission 104 is illustrated in each of the operating modes discussed above. Beginning with "Mode 1" of table 212, power flows from the input shaft 110 to the output shaft 112 as shown in FIG. 6. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 169 and some of input power 193 that is output from the third gearset 136 flows thereafter to the junction 169 through the variator 114 as discussed below. After input power 193 has been reconstituted at the junction 169, input power 193 is transmitted to the first gearset 132 through the junctions 170, 163 and the sixth clutch 128. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 6, the power transmitted from the third gearset 136 to the junction 169 has been designated input power 195 (shown in dashed). Input power 195 is transmitted from the third gearset 136 directly to the junction 169. In addition, input power 195 is transmitted from the third gearset 136 to the junction 169 through the junctions 165, 167, 168, the fourth gearset 138, and the variator 114 so that input power 193 is reconstituted at the junction 169. The variator 114 is subjected only to the input power 195 flowing from the junction 167 to the junction 168 (i.e., the variator 114 is not subjected to the entire input power 193 output from the third gearset 136).

Recirculated power 197 (designated by the dotted arrows) is recirculated from the first gearset 132 directly back to the junction 161 as shown in FIG. 6. At the junction 161, recirculated power 197 is combined with input power 193 received from the input shaft 110. Recirculated power 197 then flows in parallel with input power 193 from the junction 161 to the first gearset 132 through the third gearset 136, the junctions 169, 170, 163, and the sixth clutch 128 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 169 and from the third gearset 136 to the junction 169 through the variator 114 in identical fashion to input power 195. As such, like input power 193, combined power is reconstituted at the junction 169. Combined power is then transmitted from the junction 169 to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 6. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 7:
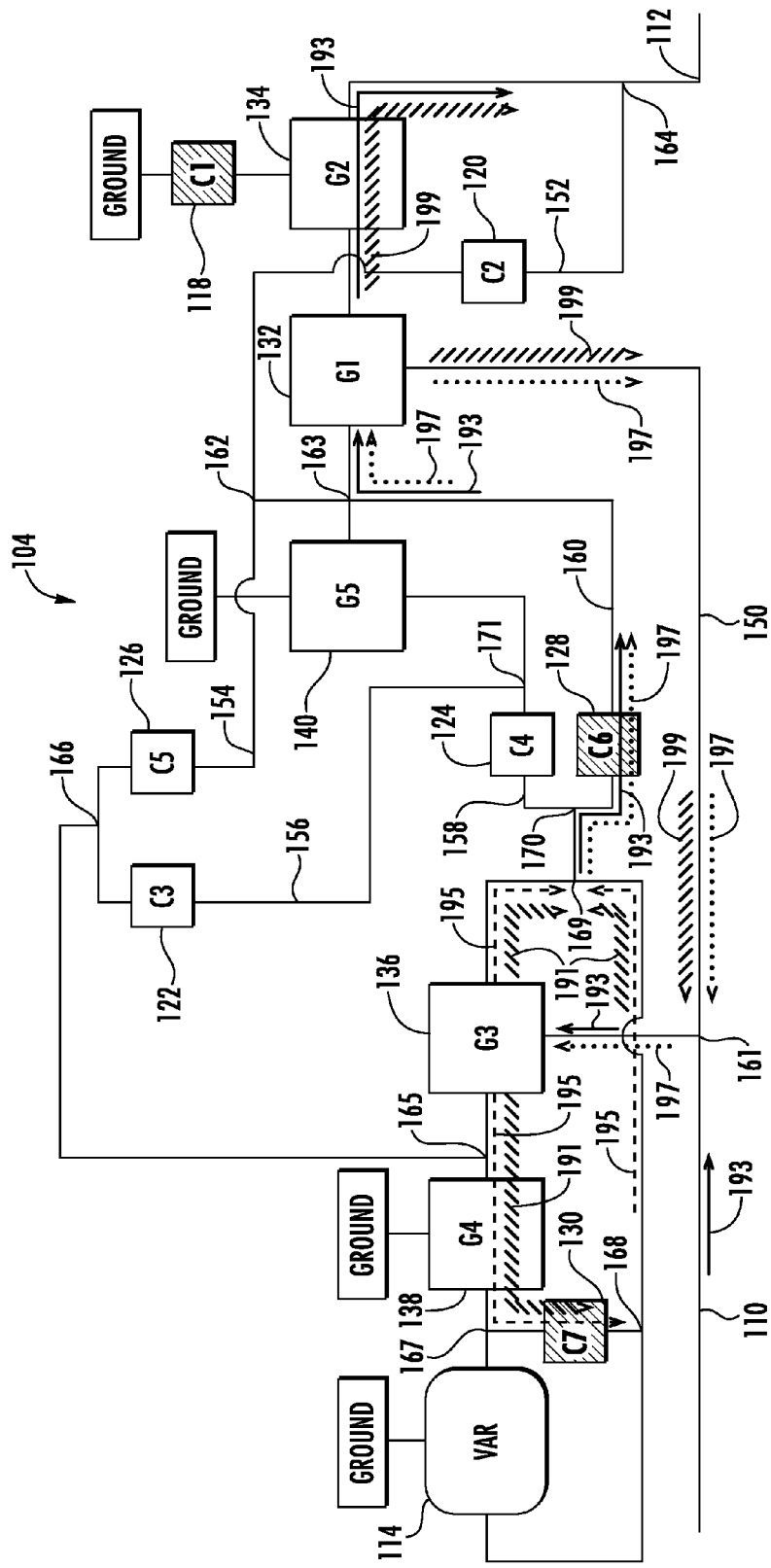
FIG. 7 is a block diagrammatic view of the infinitely variable transmission of FIG. 3 showing power flow therethrough in a first reverse variator bypass operating mode.

Turning now to the "Bypass 1" mode of table 212, power flows from the input shaft 110 to the output shaft 112 as shown in FIG. 7. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 169 and some of input power 193 that is output from the third gearset 136 flows thereafter to the junction 169 through the variator 114 as discussed below. After input power 193 has been reconstituted at the junction 169, input power 193 is transmitted to the first gearset 132 through the junctions 170, 163 and the sixth clutch 128. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 7, the power transmitted from the third gearset 136 to the junction 169 has been designated input power 195 (shown in dashed). Input power 195 is transmitted from the third gearset 136 directly to the junction 169. In addition, input power 195 is transmitted from the third gearset 136 to the junction 169 through the junctions 165, 167, 168, the fourth gearset 138, and the variator bypass clutch 130 so that input power 193 is reconstituted at the junction 169. The variator 114 is entirely bypassed and receives no power load in the "Bypass 1" mode.

Recirculated power 197 (designated by the dotted arrows) is recirculated from the first gearset 132 directly back to the junction 161 as shown in FIG. 7. At the junction 161, recirculated power 197 is combined with input power 193 received from the input shaft 110. Recirculated power 197 then flows in parallel with input power 193 from the junction 161 to the first gearset 132 through the third gearset 136, the junctions 169, 170, 163, and the sixth clutch 128 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 169 and from the third gearset 136 to the junction 169 through the variator bypass clutch 130 in identical fashion to input power 195. As such, like input power 193, combined power is reconstituted at the junction 169. Combined power is then transmitted from the junction 169 to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 7. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 8:
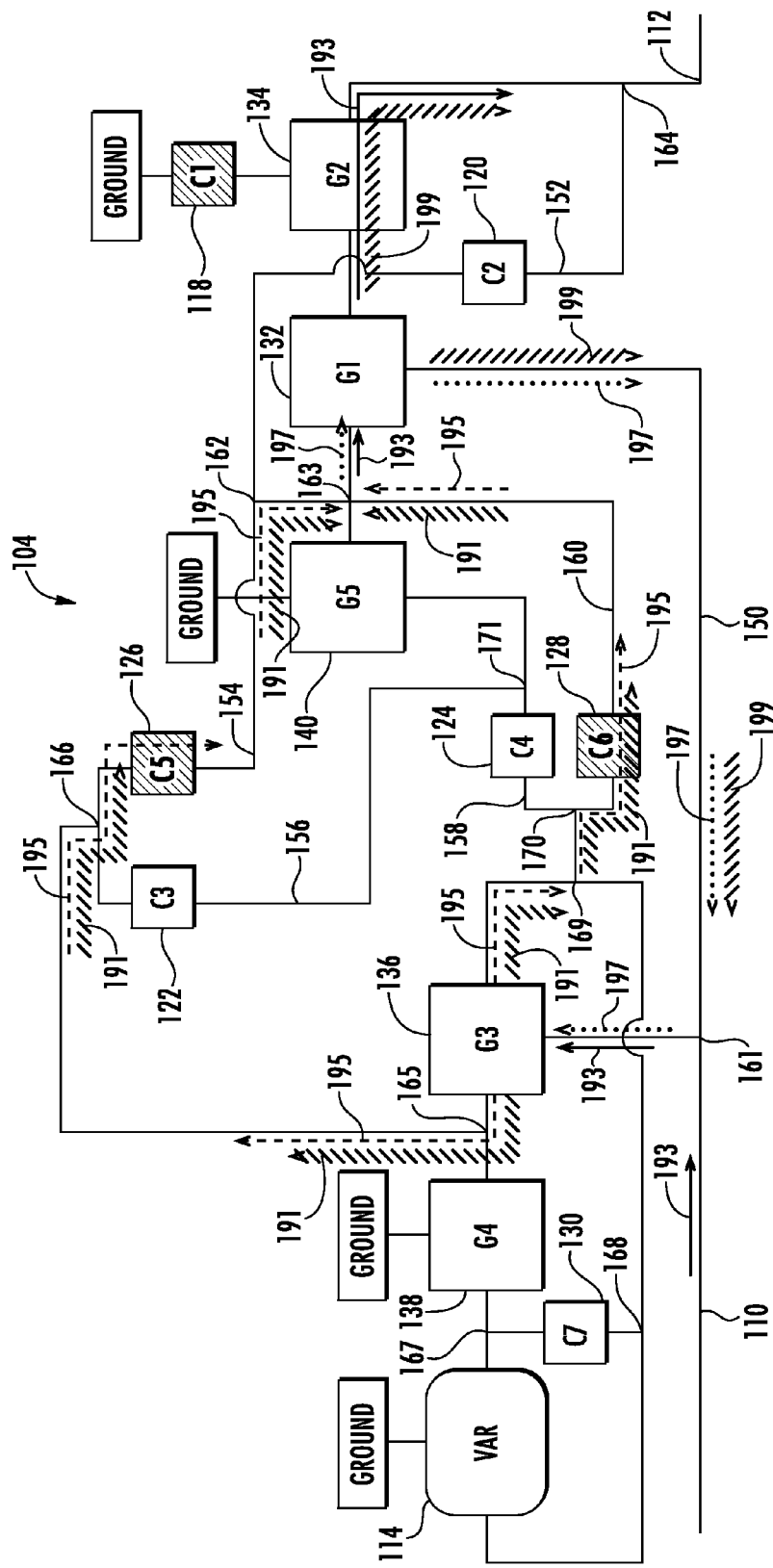
FIG. 8 is a block diagrammatic view of the infinitely variable transmission of FIG. 3 showing power flow therethrough in a first reverse synchronous operating mode.

Turning now to the "Sync 1-2" mode of table 212, power flows from the input shaft 110 to the output shaft 112 as shown in FIG. 8. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows to the junction 163 through the fifth clutch 126 and some of input power 193 that is output from the third gearset 136 flows to the junction 163 through the sixth clutch 128 as discussed below. After input power 193 has been reconstituted at the junction 163, input power 193 is transmitted directly to the first gearset 132. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 8, the power transmitted from the third gearset 136 to the junction 163 has been designated input power 195 (shown in dashed). Input power 195 is transmitted from the third gearset 136 to the junction 163 through the fifth clutch 126 and the junctions 165, 166, 162. In addition, input power 195 is transmitted from the third gearset 136 to the junction 163 through the sixth clutch 128 and the junctions 169, 170, 171 so that input power 193 is reconstituted at the junction 163. The variator 114 is entirely bypassed and receives no power load in the "Sync 1-2" mode.

Recirculated power 197 (designated by the dotted arrows) is recirculated from the first gearset 132 directly back to the junction 161 as shown in FIG. 8. At the junction 161, recirculated power 197 is combined with input power 193 received from the input shaft 110. Recirculated power 197 then flows in parallel with input power 193 from the junction 161 to the first gearset 132 through the third gearset 136 and the junction 163 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 to the junction 163 through the fifth clutch 126 and the junctions 166, 162 and from the third gearset 136 to the junction 163 through the sixth clutch 128 and the junctions 169, 170 in identical fashion to input power 195. As such, like input power 193, combined power is reconstituted at the junction 163. Combined power is then transmitted from the junction 163 directly to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 8. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 9:
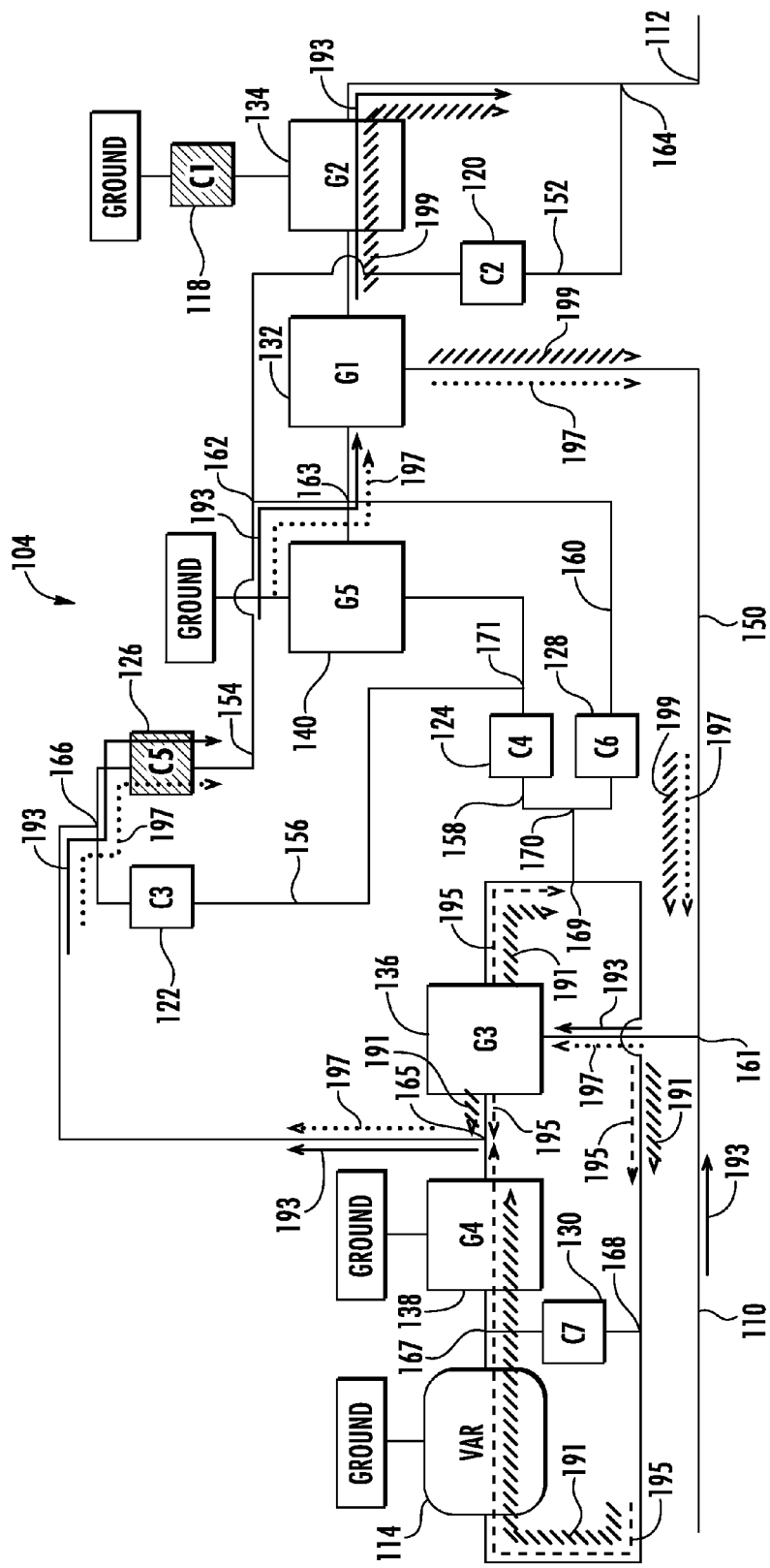
FIG. 9 is a block diagrammatic view of the infinitely variable transmission of FIG. 3 showing power flow therethrough in a second reverse operating mode.

Turning now to "Mode 2" of table 212, power flows from the input shaft 110 to the output shaft 112 as shown in FIG. 9. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 165 and some of input power 193 that is output from the third gearset 136 flows thereafter to the junction 165 through the variator 114 as discussed below. After input power 193 has been reconstituted at the junction 165, input power 193 is transmitted to the first gearset 132 through the junctions 166, 162, 163 and the fifth clutch 126. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 9, the power transmitted from the third gearset 136 to the junction 165 has been designated input power 195 (shown in dashed). Input power 195 is transmitted from the third gearset 136 directly to the junction 165. In addition, input power 195 is transmitted from the third gearset 136 to the junction 165 through the junctions 169, 168, 167 the fourth gearset 138, and the variator 114 so that input power 193 is reconstituted at the junction 165. The variator 114 is subjected only to the input power 195 flowing from the junction 168 to the junction 167 (i.e., the variator 114 is not subjected to the entire input power 193 output from the third gearset 136).

Recirculated power 197 (designated by the dotted arrows) is recirculated from the first gearset 132 directly back to the junction 161 as shown in FIG. 9. At the junction 161, recirculated power 197 is combined with input power 193 received from the input shaft 110. Recirculated power 197 then flows in parallel with input power 193 from the junction 161 to the first gearset 132 through the third gearset 136, the junctions 165, 166, 162, 163 and the fifth clutch 126 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 165 and from the third gearset 136 to the junction 165 through the variator 114 in identical fashion to input power 195. As such, like input power 193, combined power is reconstituted at the junction 165. Combined power is then transmitted from the junction 165 to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 9. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 10:
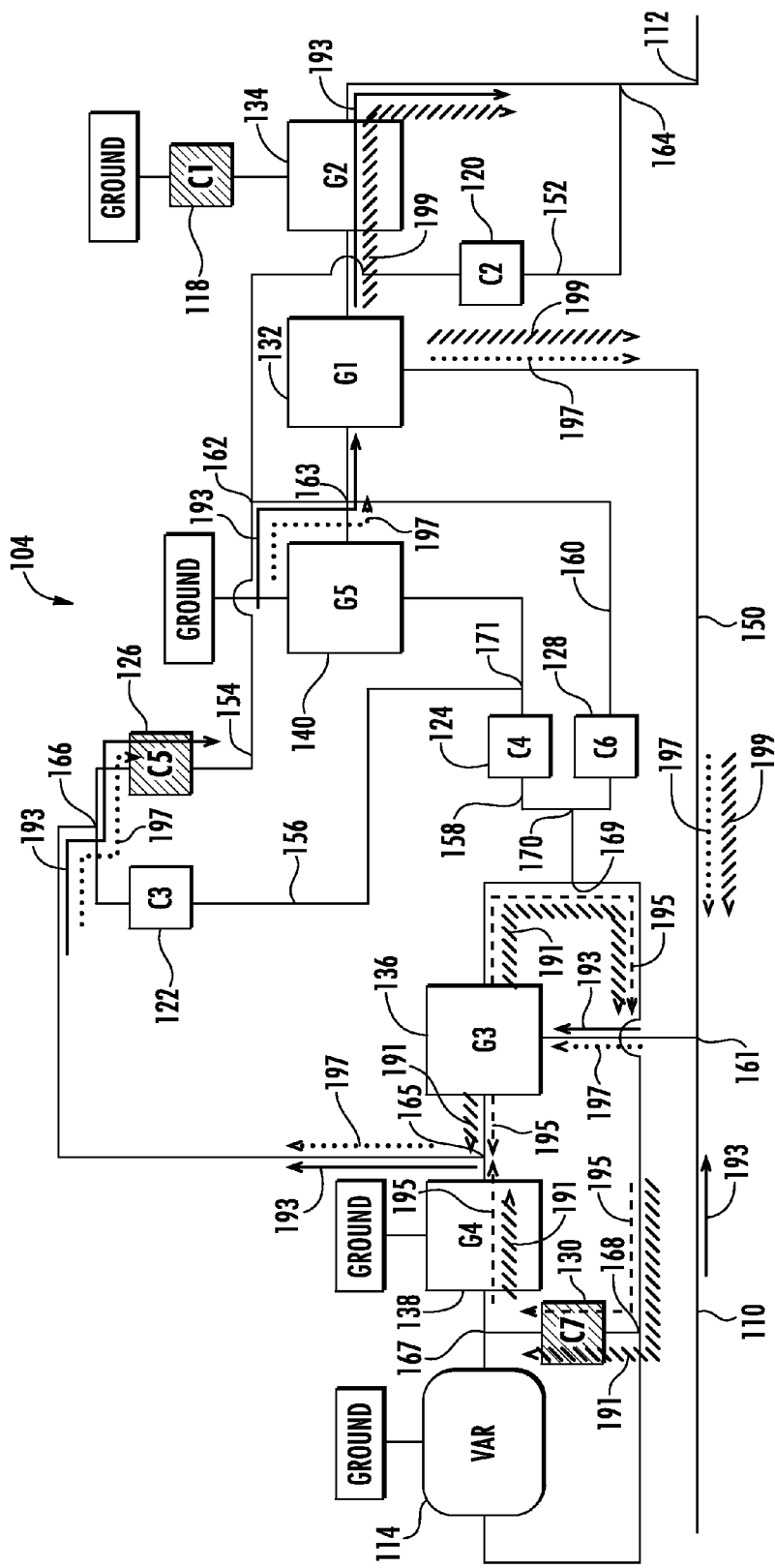
FIG. 10 is a block diagrammatic view of the infinitely variable transmission of FIG. 3 showing power flow therethrough in a second reverse variator bypass operating mode.

Turning now to the "Bypass 2" mode of table 212, power flows from the input shaft 110 to the output shaft 112 as shown in FIG. 10. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 165 and some of input power 193 that is output from the third gearset 136 flows thereafter to the junction 165 through the variator bypass clutch 130 as discussed below. After input power 193 has been reconstituted at the junction 165, input power 193 is transmitted to the first gearset 132 through the junctions 166, 162, 163 and the fifth clutch 126. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 10, the power transmitted from the third gearset 136 to the junction 165 has been designated input power 195 (shown in dashed). Input power 195 is transmitted from the third gearset 136 directly to the junction 165. In addition, input power 195 is transmitted from the third gearset 136 to the junction 165 through the junctions 169, 168, 167 the fourth gearset 138, and the variator bypass clutch 130 so that input power 193 is reconstituted at the junction 165. The variator 130 is bypassed entirely and receives no power load in the "Bypass 1" mode.

Recirculated power 197 (designated by the dotted arrows) is recirculated from the first gearset 132 directly back to the junction 161 as shown in FIG. 10. At the junction 161, recirculated power 197 is combined with input power 193 received from the input shaft 110. Recirculated power 197 then flows in parallel with input power 193 from the junction 161 to the first gearset 132 through the third gearset 136, the junctions 165, 166, 162, 163 and the fifth clutch 126 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 165 and from the third gearset 136 to the junction 165 through the variator bypass clutch 130 in identical fashion to input power 195. As such, like input power 193, combined power is reconstituted at the junction 165. Combined power is then transmitted from the junction 165 to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 10. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 11:
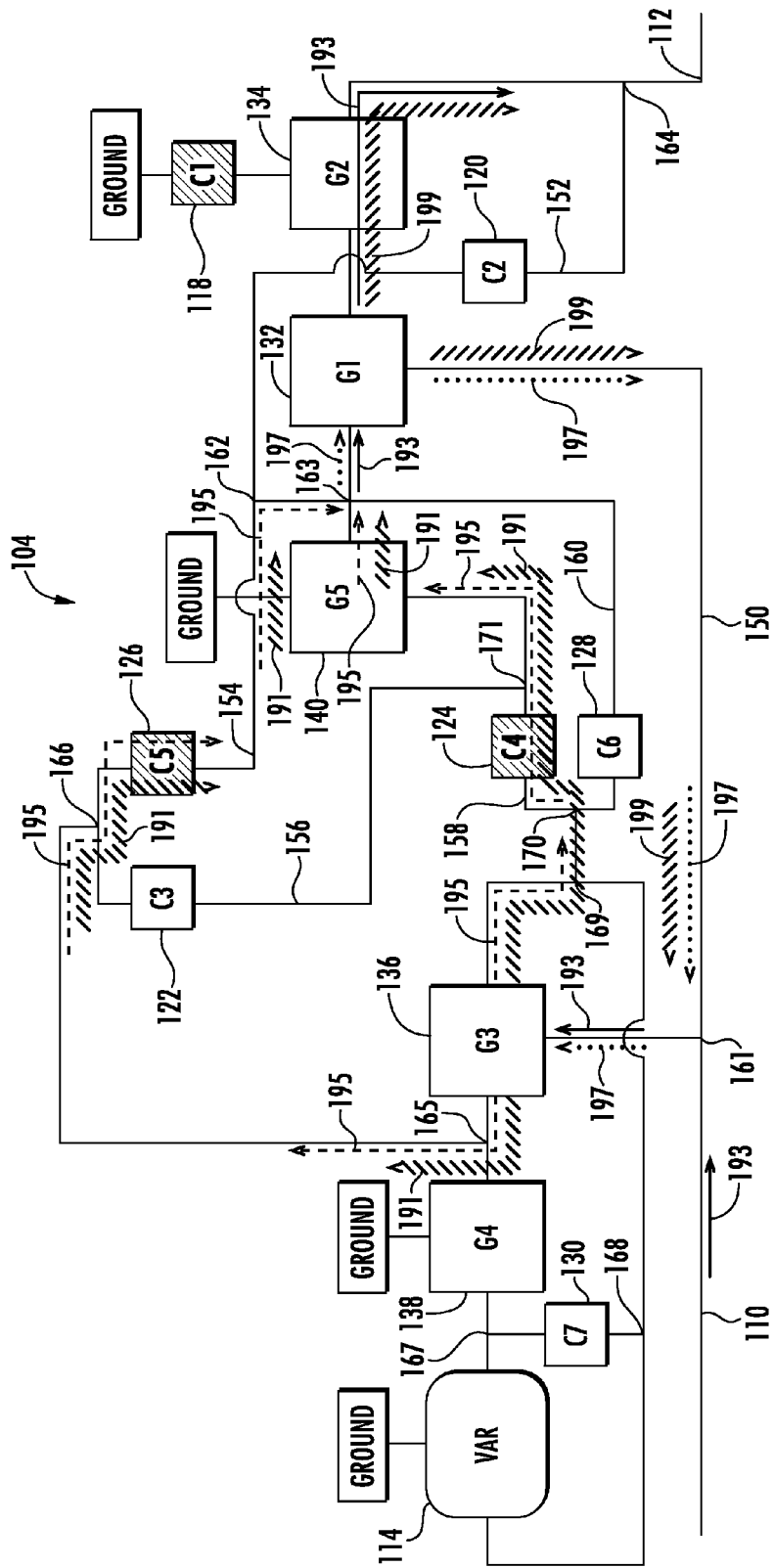
FIG. 11 is a block diagrammatic view of the infinitely variable transmission of FIG. 3 showing power flow therethrough in a second reverse synchronous operating mode.

Turning now to the "Sync 2-3" mode of table 212, power flows from the input shaft 110 to the output shaft 112 as shown in FIG. 11. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows to the junction 163 through the fifth clutch 126 and some of input power 193 that is output from the third gearset 136 flows to the junction 163 through the fourth clutch 124 as discussed below. After input power 193 has been reconstituted at the junction 163, input power 193 is transmitted directly to the first gearset 132. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 11, the power transmitted from the third gearset 136 to the junction 163 has been designated input power 195 (shown in dashed). Input power 195 is transmitted from the third gearset 136 to the junction 163 through the fifth clutch 126 and the junctions 165, 166, 162. In addition, input power 195 is transmitted from the third gearset 136 to the junction 163 through the fourth clutch 124, the junctions 169, 170, 171, and the fifth gearset 140 so that input power 193 is reconstituted at the junction 163. The variator 114 is entirely bypassed and receives no power load in the "Sync 2-3" mode.

Recirculated power 197 (designated by the dotted arrows) is recirculated from the first gearset 132 directly back to the junction 161 as shown in FIG. 11. At the junction 161, recirculated power 197 is combined with input power 193 received from the input shaft 110. Recirculated power 197 then flows in parallel with input power 193 from the junction 161 to the first gearset 132 through the third gearset 136 and the junction 163 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 to the junction 163 through the fifth clutch 126 and the junctions 165, 166, 162 and from the third gearset 136 to the junction 163 through the fourth clutch 124 and the junctions 169, 170, 171 in identical fashion to input power 195. As such, like input power 193, combined power is reconstituted at the junction 163. Combined power is then transmitted from the junction 163 directly to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 11. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 12:
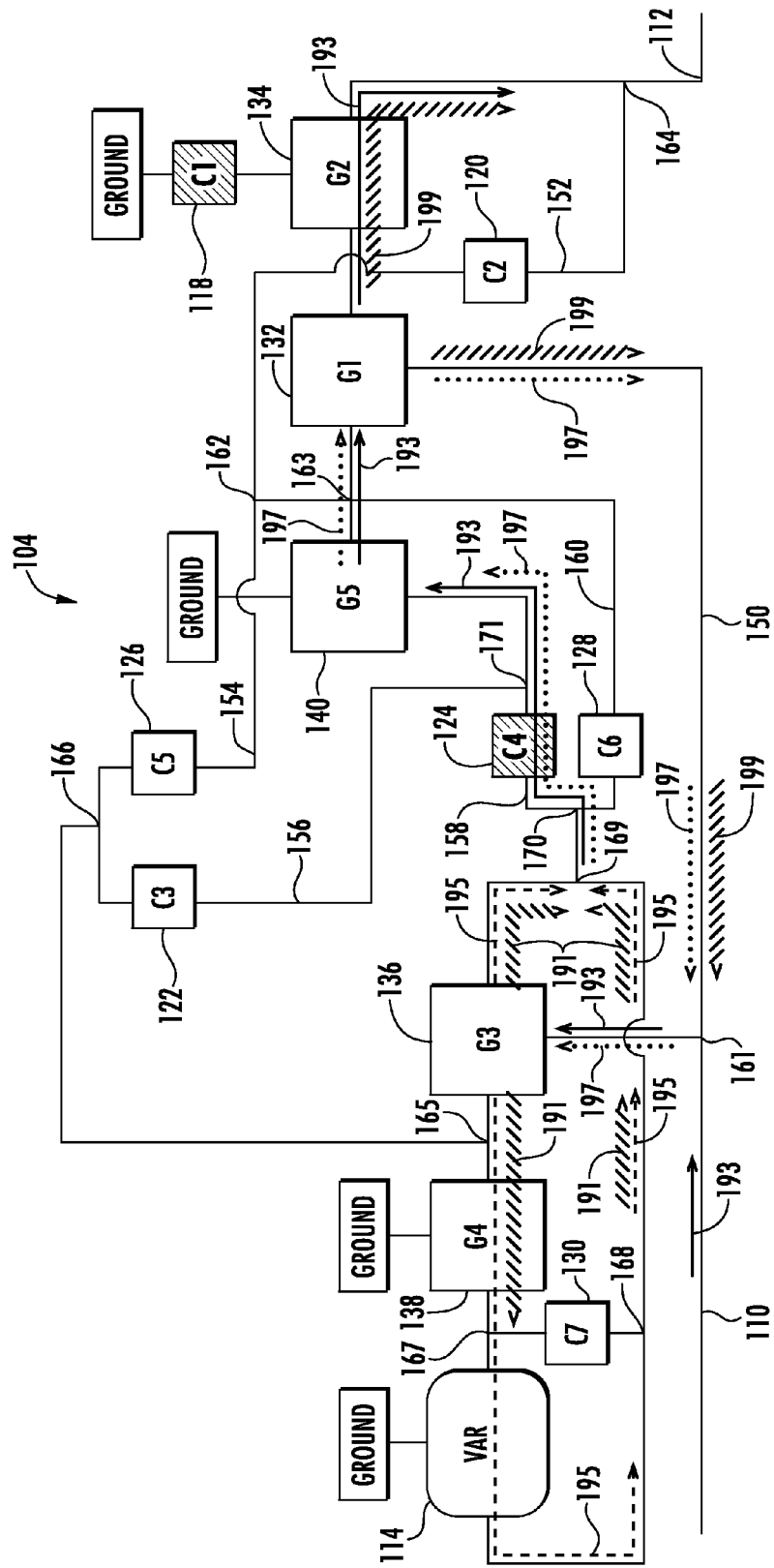
FIG. 12 is a block diagrammatic view of the infinitely variable transmission of FIG. 3 showing power flow therethrough in a reverse ratio range of a third operating mode.

Turning now to the reverse ratio range of "Mode 3" of table 212, power flows from the input shaft 110 to the output shaft 112 as shown in FIG. 12. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 169 and some of input power 193 that is output from the third gearset 136 flows thereafter to the junction 169 through the variator 114 as discussed below. After input power 193 has been reconstituted at the junction 169, input power 193 is transmitted to the first gearset 132 through the junctions 170, 171, 163, the fourth clutch 124, and the fifth gearset 140. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 12, the power transmitted from the third gearset 136 to the junction 169 has been designated input power 195 (shown in dashed). Input power 195 is transmitted from the third gearset 136 directly to the junction 169. In addition, input power 195 is transmitted from the third gearset 136 to the junction 169 through the junctions 165, 167, 168, the fourth gearset 138, and the variator 114 so that input power 193 is reconstituted at the junction 169. The variator 114 is subjected only to the input power 195 flowing from the junction 167 to the junction 168 (i.e., the variator 114 is not subjected to the entire input power 193 transmitted to the third gearset 136).

Recirculated power 197 (designated by the dotted arrows) is recirculated from the first gearset 132 directly back to the junction 161 as shown in FIG. 12. At the junction 161, recirculated power 197 is combined with input power 193 received from the input shaft 110. Recirculated power 197 then flows in parallel with input power 193 from the junction 161 to the first gearset 132 through the third gearset 136, the junctions 169, 170, 171, 163, the fourth clutch 124, and the fifth gearset 140 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 169 and from the third gearset 136 to the junction 169 through the variator 114 in identical fashion to input power 195. As such, like input power 193, combined power is reconstituted at the junction 169. Combined power is then transmitted from the junction 169 to the first gearset 132 in parallel with and in identical fashion to input power 193.

The "mixing" gearset 132 breaks up the combined power into split power 199 (designated by the backslashed arrows), which is transmitted to the output shaft 112 and back to the junction 161, as shown in FIG. 12. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 13:
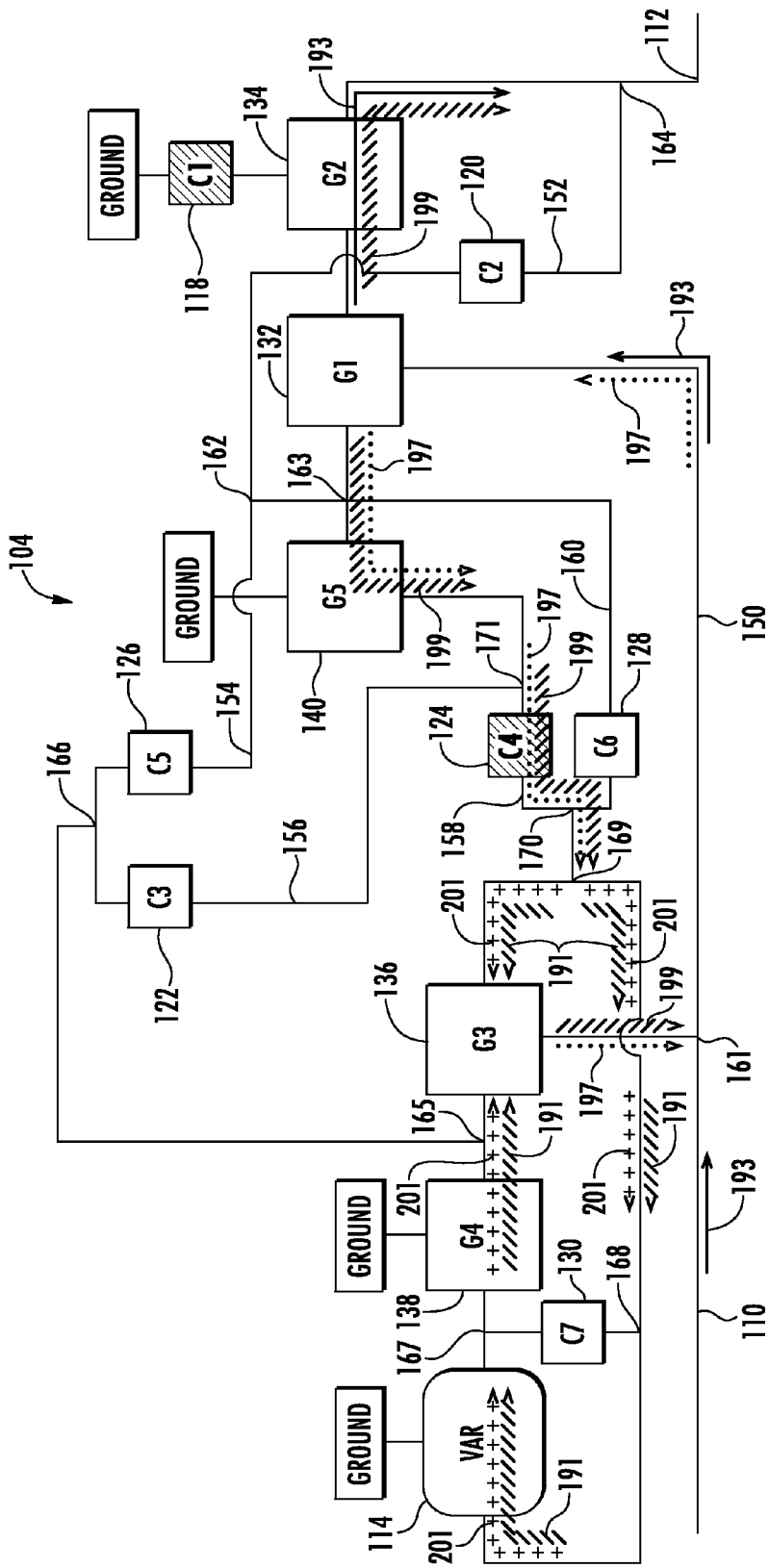
FIG. 13 is a block diagrammatic view of the infinitely variable transmission of FIG. 3 showing power flow therethrough in a forward ratio range of the third operating mode.

Turning now to the forward ratio range of "Mode 3" of table 212, power flows from the input shaft 110 to the output shaft 112 of the transmission 104 as shown in FIG. 13. Input power 193 (designated by the solid arrows) flows from the input shaft 110 to the junction 161 and thereafter to the first gearset 132. Input power 193 flowing to the first gearset 132 is modified by the "mixing" gearset 132 such that some of input power 193 that is output from the first gearset 132 flows thereafter to the output shaft 112 through the second gearset 134 and the junction 164 and some of input power 193 that is output from the first gearset 132 is transmitted back to the junction 161, as discussed in greater detail below.

Recirculated power 197 (designated by the dotted arrows) is recirculated from the first gearset 132 back to the junction 169 through the junctions 163, 171, 170, the fifth gearset 140, and the fourth clutch 124 as shown in FIG. 13. Recirculated power 197 then becomes recirculated power 201 that flows from the junction 169 to the third gearset 136 where recirculated power 197 is reconstituted as discussed below. Recirculated power 197 flows directly from the third gearset 136 to the junction 161 where recirculated power 197 is combined with input power 193 received from the input shaft 110. Recirculated power 197 then flows in parallel with input power 193 from the junction 161 directly to the first gearset 132 in identical fashion to input power 193. Hereafter, the combination of input power 193 and recirculated power 197 is referred to as "combined power" and is understood to be greater than input power 193 and recirculated power 197.

Recirculated power 201 (designated by the plus-sign arrows) is transmitted from the junction 169 directly to the third gearset 136 as shown in FIG. 13. Recirculated power 201 is also transmitted from the junction 169 to the third gearset 136 through the junctions 169, 168, 167, the fourth gearset 138, and the variator 114. As such, recirculated power 197 is reconstituted at the third gearset 136 as indicated above. The variator 114 is subjected only to the recirculated power 201 flowing from the junction 168 to the junction 167 (i.e., the variator 114 is not subjected to the entire recirculated power 197 transmitted to the junction 169).

The "mixing" gearset 132 breaks up the combined power into split power 199 (designated by the backslashed arrows), which is transmitted to the output shaft 112 and back to the junction 161, as shown in FIG. 13. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 in parallel with and in identical fashion to recirculated power 197.

The junction 169 breaks up the split power 199 recirculated thereto from the first gearset 132 through the junctions 163, 171, 170, the fifth gearset 140, and the fourth clutch 124 into split power 191 (designated by the slashed arrows) as shown in FIG. 13. Split power 191 is transmitted in parallel with recirculated power 201 directly from the junction 169 to the third gearset 136 and also from the junction 169 to the third gearset 136 through the junctions 169, 168, 167, the fourth gearset 138, and the variator 114 in identical fashion to recirculated power 201. As such, like recirculated power 197, split power 199 is reconstituted at the third gearset 136. Split power 199 is transmitted from the third gearset 136 to the junction 161 in identical fashion to recirculated power 197.

Figure 14:
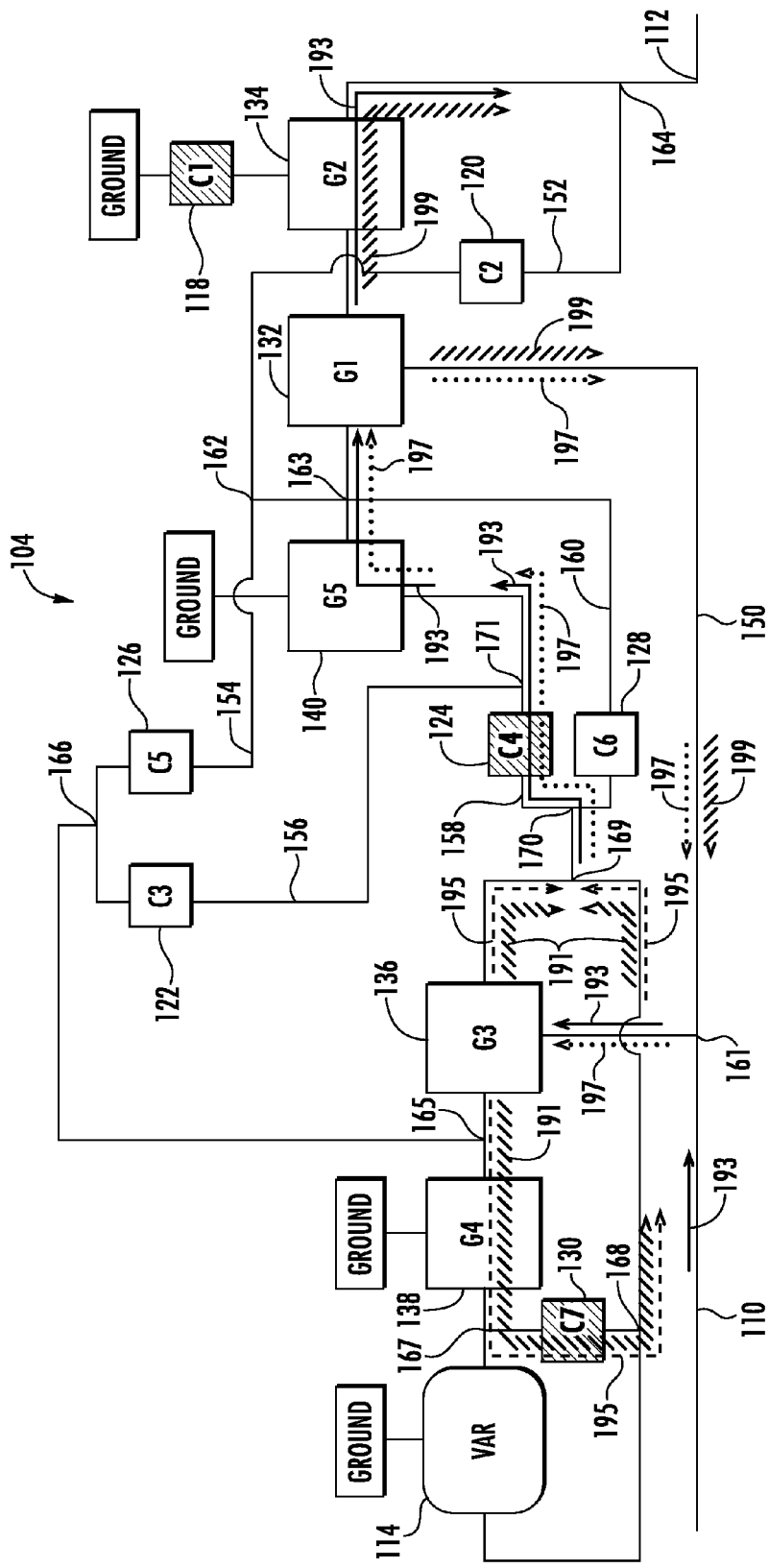
FIG. 14 is a block diagrammatic view of the infinitely variable transmission of FIG. 3 showing power flow therethrough in a third reverse variator bypass operating mode.

Turning now to the "Bypass 3" mode of table 212, power flows from the input shaft 110 to the output shaft 112 as shown in FIG. 14. Input power 193 (designated by the solid arrows) flows from the input shaft 110 to the junction 161 and thereafter to the third gearset 136. Input power 193 flowing to the third gearset 136 is modified by the "mixing" gearset 136 such that some of input power 193 that is output from the third gearset 136 flows thereafter directly to the junction 169 and some of input power 193 that is output from the third gearset 136 flows thereafter to the junction 169 through the variator 114 as discussed below. After input power 193 has been reconstituted at the junction 169, input power 193 is transmitted to the first gearset 132 through the junctions 170, 171, 163, the fourth clutch 124, and the fifth gearset 140. Input power 193 reaching the first gearset 132 is modified by the "mixing" gearset 132 such that some of the input power 193 that is output from the first gearset 132 is transmitted to the output shaft 112 through the second gearset 134 and the junction 164 and some of the input power 193 that is output from the first gearset 132 is transmitted back to the junction 161, as discussed in greater detail below.

As shown in FIG. 14, the power transmitted from the third gearset 136 to the junction 169 has been designated input power 195 (shown in dashed). Input power 195 is transmitted from the third gearset 136 directly to the junction 169. In addition, input power 195 is transmitted from the third gearset 136 to the junction 169 through the junctions 165, 167, 168 the fourth gearset 138, and the variator bypass clutch 130 so that input power 193 is reconstituted at the junction 169. The variator 130 is entirely bypassed and receives no power load in the "Bypass 3" mode.

Recirculated power 197 (designated by the dotted arrows) is recirculated from the first gearset 132 directly back to the junction 161 as shown in FIG. 14. At the junction 161, recirculated power 197 is combined with input power 193 received from the input shaft 110. Recirculated power 197 then flows in parallel with input power 193 from the junction 161 to the first gearset 132 through the third gearset 136, the junctions 169, 170, 171, the fourth clutch 124, and the fifth gearset 140 in identical fashion to input power 193. Hereafter, the combination of input power 193 and recirculated power 197 is referred to as "combined power" and is understood to be greater than input power 193 and recirculated power 197.

The "mixing" gearset 136 breaks up the combined power into split power 191 (designated by the slashed arrows), which is transmitted in parallel with input power 195 from the third gearset 136 directly to the junction 169 and from the third gearset 136 to the junction 169 through the variator bypass clutch 130 in identical fashion to input power 195 as shown in FIG. 14. As such, like input power 193, combined power is reconstituted at the junction 169. Combined power is then transmitted from the junction 169 to the first gearset 132 in identical fashion to input power 193.

The "mixing" gearset 132 breaks up the combined power into split power 199 (designated by the backslashed arrows), which is transmitted to the output shaft 112 and back to the junction 161, as shown in FIG. 14. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 and, like recirculated power 197, back through the third gearset 136 to the first gearset 132 in parallel with input power 193.

Figure 15:
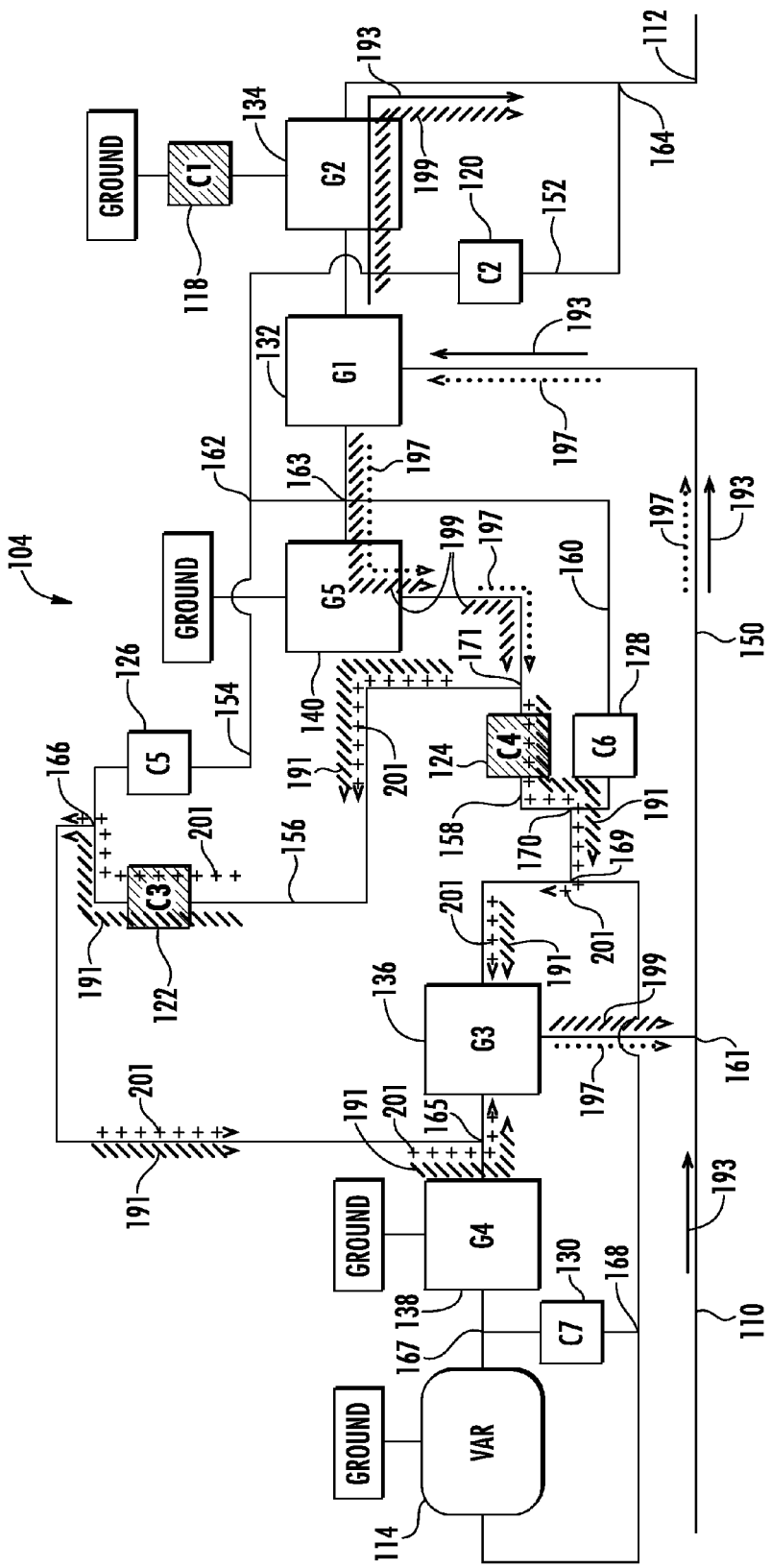
FIG. 15 is a block diagrammatic view of the infinitely variable transmission of FIG. 3 showing power flow therethrough in a third forward synchronous operating mode.

Turning now to the "Sync 3-4" mode of table 212, power flows from the input shaft 110 to the output shaft 112 as shown in FIG. 15. Input power 193 (designated by the solid arrows) flows from the input shaft 110 to the junction 161 and thereafter to the first gearset 132. Input power 193 flowing to the first gearset 132 is modified by the "mixing" gearset 132 such that some of input power 193 that is output from the first gearset 132 flows thereafter to the output shaft 112 through the second gearset 134 and the junction 164 and some of input power 193 that is output from the first gearset 132 is transmitted back to the junction 161, as discussed in greater detail below.

Recirculated power 197 (designated by the dotted arrows) is recirculated from the first gearset 132 back to the junction 171 through the junction 163 and the fifth gearset 140 as shown in FIG. 15. Recirculated power 197 then becomes recirculated power 201 that flows from the junction 171 to the third gearset 136 where recirculated power 197 is reconstituted as discussed below. Recirculated power 197 flows directly from the third gearset 136 to the junction 161 where recirculated power 197 is combined with input power 193 received from the input shaft 110. Recirculated power 197 then flows in parallel with input power 193 from the junction 161 directly to the first gearset 132 in identical fashion to input power 193. Hereafter, the combination of input power 193 and recirculated power 197 is referred to as "combined power" and is understood to be greater than input power 193 and recirculated power 197.

Recirculated power 201 (designated by the plus-sign arrows) is transmitted from the junction 171 to the third gearset 136 through the third clutch 122 and the junctions 165, 166 as shown in FIG. 15. Recirculated power 201 is also transmitted from the junction 171 to the third gearset 136 through the fourth clutch 124 and the junctions 170, 169. As such, recirculated power 197 is reconstituted at the third gearset 136 as indicated above. The variator 114 is entirely bypassed and receives no power load in the "Sync 3-4" operating mode.

The "mixing" gearset 132 breaks up the combined power into split power 199 (designated by the backslashed arrows), which is transmitted to the output shaft 112 and back to the junction 161, as shown in FIG. 15. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 in parallel with and in identical fashion to recirculated power 197.

The junction 171 breaks up the split power 199 recirculated thereto from the first gearset 132 through the junction 163 and the fifth gearset 140 into split power 191 (designated by the slashed arrows) as shown in FIG. 15. Split power 191 is transmitted in parallel with recirculated power 201 from the junction 171 to the third gearset 136 through the third clutch 122 and the junctions 166, 165, and also from the junction 171 to the third gearset 136 through the junctions 169, 170 and the fourth clutch 124 in identical fashion to recirculated power 201. As such, like recirculated power 197, split power 199 is reconstituted at the third gearset 136. Split power 199 is transmitted from the third gearset 136 to the junction 161 in identical fashion to recirculated power 197.

Figure 16:
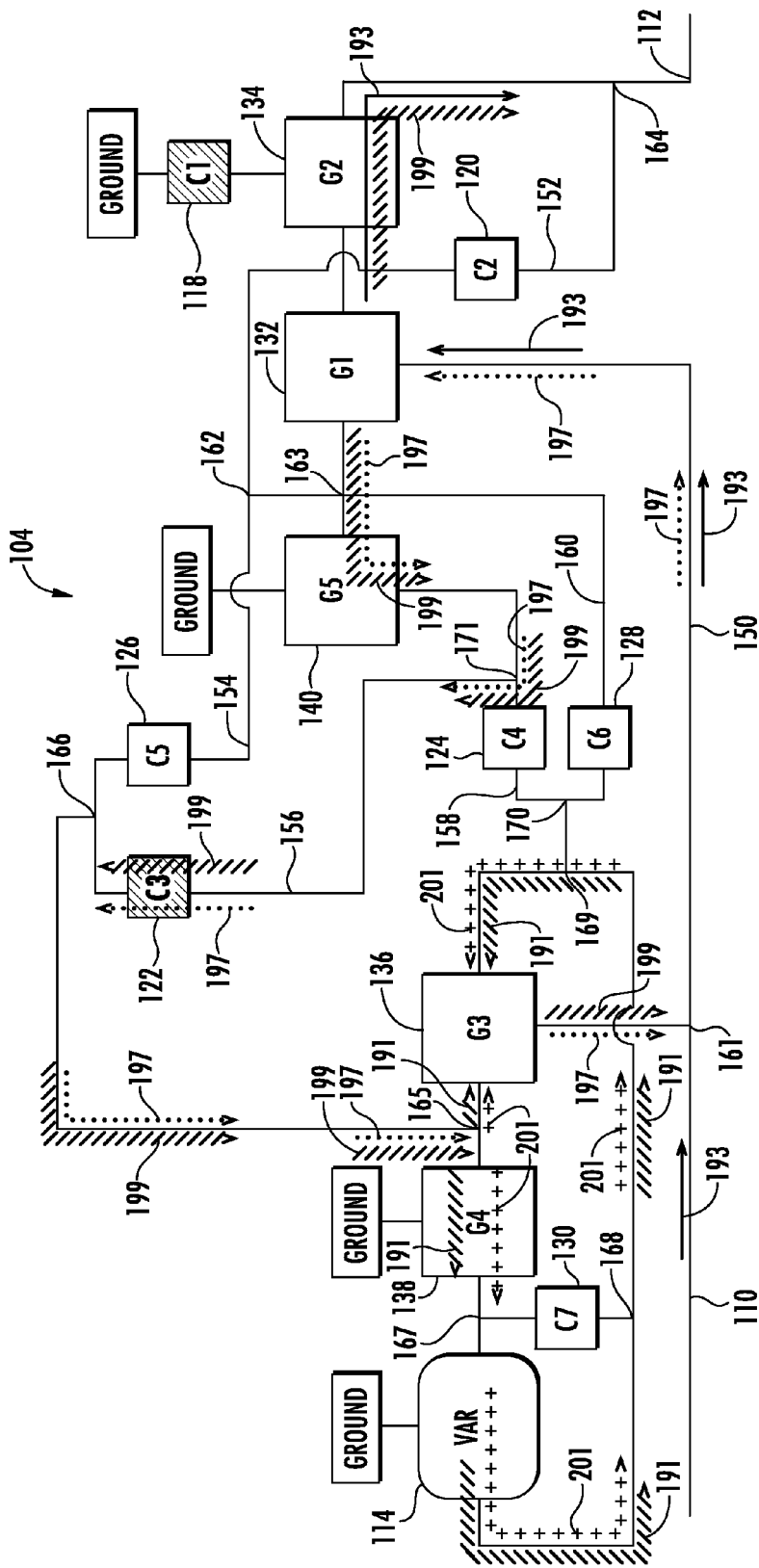
FIG. 16 is a block diagrammatic view of the infinitely variable transmission of FIG. 3 showing power flow therethrough in a fourth forward operating mode.

Turning now to "Mode 4" of table 212, power flows from the input shaft 110 to the output shaft 112 of the transmission 104 as shown in FIG. 16. Input power 193 (designated by the solid arrows) flows from the input shaft 110 to the junction 161 and thereafter to the first gearset 132. Input power 193 flowing to the first gearset 132 is modified by the "mixing" gearset 132 such that some of input power 193 that is output from the first gearset 132 flows thereafter to the output shaft 112 through the second gearset 134 and the junction 164 and some of input power 193 that is output from the first gearset 132 is transmitted back to the junction 161, as discussed in greater detail below.

Recirculated power 197 (designated by the dotted arrows) is recirculated from the first gearset 132 back to the junction 165 through the junctions 163, 171, 166, the fifth gearset 140, and the third clutch 122 as shown in FIG. 16. Recirculated power 197 then becomes recirculated power 201 that flows from the junction 165 to the third gearset 136 where recirculated power 197 is reconstituted as discussed below. Recirculated power 197 flows directly from the third gearset 136 to the junction 161 where recirculated power 197 is combined with input power 193 received from the input shaft 110. Recirculated power 197 then flows in parallel with input power 193 from the junction 161 directly to the first gearset 132 in identical fashion to input power 193. Hereafter, the combination of input power 193 and recirculated power 197 is referred to as "combined power" and is understood to be greater than input power 193 and recirculated power 197.

Recirculated power 201 (designated by the plus-sign arrows) is transmitted from the junction 165 directly to the third gearset 136 as shown in FIG. 16. Recirculated power 201 is also transmitted from the junction 165 to the third gearset 136 through the junctions 167, 168, 169, the fourth gearset 138, and the variator 114. As such, recirculated power 197 is reconstituted at the third gearset 136 as indicated above. The variator 114 is subjected only to the recirculated power 201 flowing from the junction 167 to the junction 168 (i.e., the variator 114 is not subjected to the entire recirculated power 197 transmitted to the junction 165).

The "mixing" gearset 132 breaks up the combined power into split power 199 (designated by the backslashed arrows), which is transmitted to the output shaft 112 and back to the junction 161, as shown in FIG. 16. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 in parallel with and in identical fashion to recirculated power 197.

The junction 165 breaks up the split power 199 recirculated thereto from the first gearset 132 through the junctions 163, 171, 166, the fifth gearset 140, and the third clutch 122 into split power 191 (designated by the slashed arrows) as shown in FIG. 16. Split power 191 is transmitted in parallel with recirculated power 201 directly from the junction 165 to the third gearset 136 and also from the junction 165 to the third gearset 136 through the junctions 167, 168, 169, the fourth gearset 138, and the variator 114 in identical fashion to recirculated power 201. As such, like recirculated power 197, split power 199 is reconstituted at the third gearset 136. Split power 199 is transmitted from the third gearset 136 to the junction 161 in identical fashion to recirculated power 197.

Figure 17:
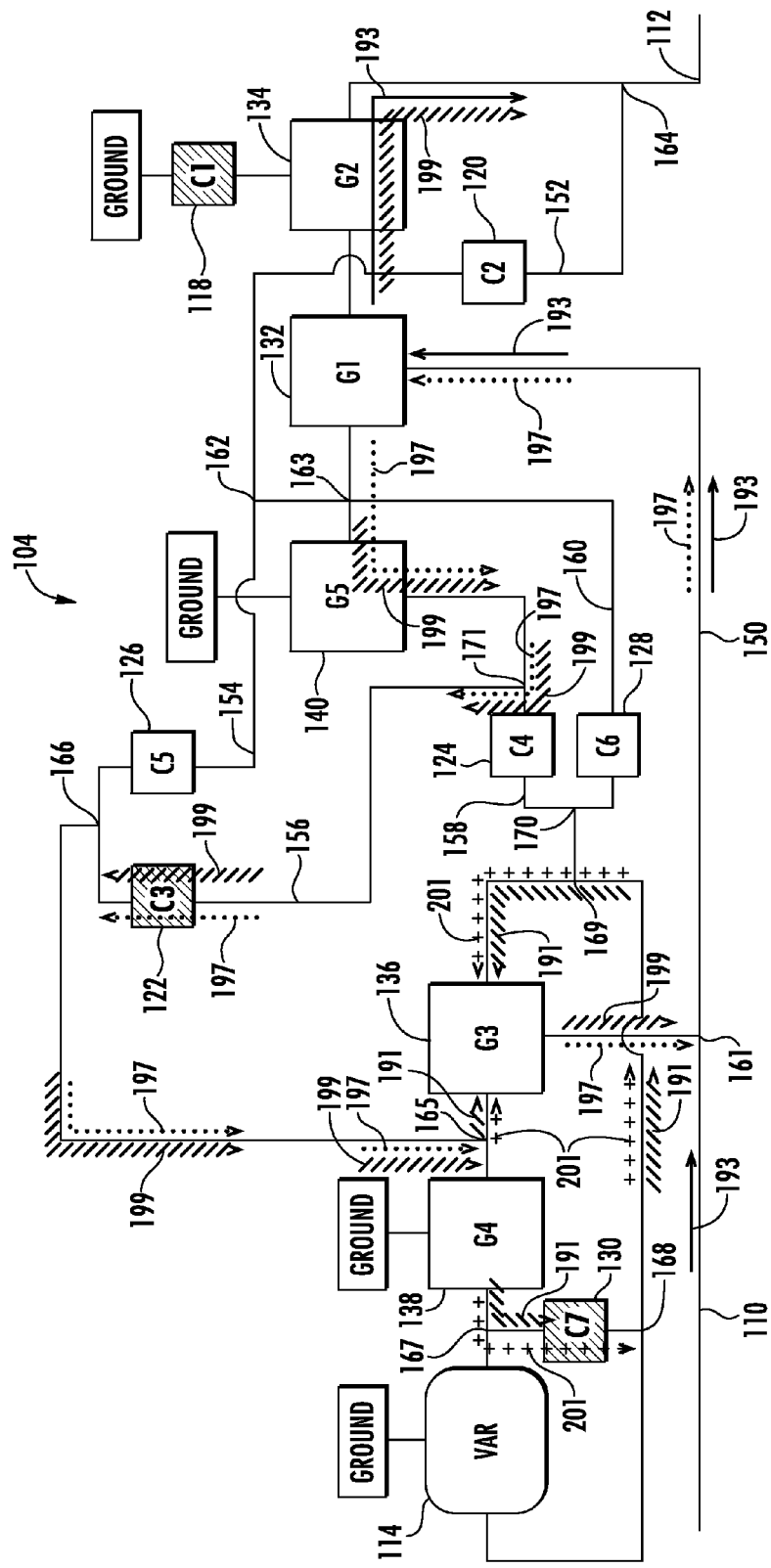
FIG. 17 is a block diagrammatic view of the infinitely variable transmission of FIG. 3 showing power flow therethrough in a fourth forward variator bypass operating mode.

Turning now to the "Bypass 4" mode of table 212, power flows from the input shaft 110 to the output shaft 112 of the transmission 104 as shown in FIG. 17. Input power 193 (designated by the solid arrows) flows from the input shaft 110 to the junction 161 and thereafter to the first gearset 132. Input power 193 flowing to the first gearset 132 is modified by the "mixing" gearset 132 such that some of input power 193 that is output from the first gearset 132 flows thereafter to the output shaft 112 through the second gearset 134 and the junction 164 and some of input power 193 that is output from the first gearset 132 is transmitted back to the junction 161, as discussed in greater detail below.

Recirculated power 197 (designated by the dotted arrows) is recirculated from the first gearset 132 back to the junction 165 through the junctions 163, 171, 166, the fifth gearset 140, and the third clutch 122 as shown in FIG. 17. Recirculated power 197 then becomes recirculated power 201 that flows from the junction 165 to the third gearset 136 where recirculated power 197 is reconstituted as discussed below. Recirculated power 197 flows directly from the third gearset 136 to the junction 161 where recirculated power 197 is combined with input power 193 received from the input shaft 110. Recirculated power 197 then flows in parallel with input power 193 from the junction 161 directly to the first gearset 132 in identical fashion to input power 193. Hereafter, the combination of input power 193 and recirculated power 197 is referred to as "combined power" and is understood to be greater than input power 193 and recirculated power 197.

Recirculated power 201 (designated by the plus-sign arrows) is transmitted from the junction 165 directly to the third gearset 136 as shown in FIG. 17. Recirculated power 201 is also transmitted from the junction 165 to the third gearset 136 through the junctions 167, 168, 169, the fourth gearset 138, and the variator bypass clutch 130. As such, recirculated power 197 is reconstituted at the third gearset 136 as indicated above. The variator 114 is entirely bypassed and receives no power load in the "Bypass 4" mode.

The "mixing" gearset 132 breaks up the combined power into split power 199 (designated by the backslashed arrows), which is transmitted to the output shaft 112 and back to the junction 161, as shown in FIG. 17. In this way, some split power 199 flows from the first gearset 132 to the output shaft 112 through the second gearset 134 and the junction 164 (like input power 193), thereby adding to the power transmitted to the output shaft 112. Some split power 199 also flows from the first gearset 132 to the junction 161 in parallel with and in identical fashion to recirculated power 197.

Figure 18:
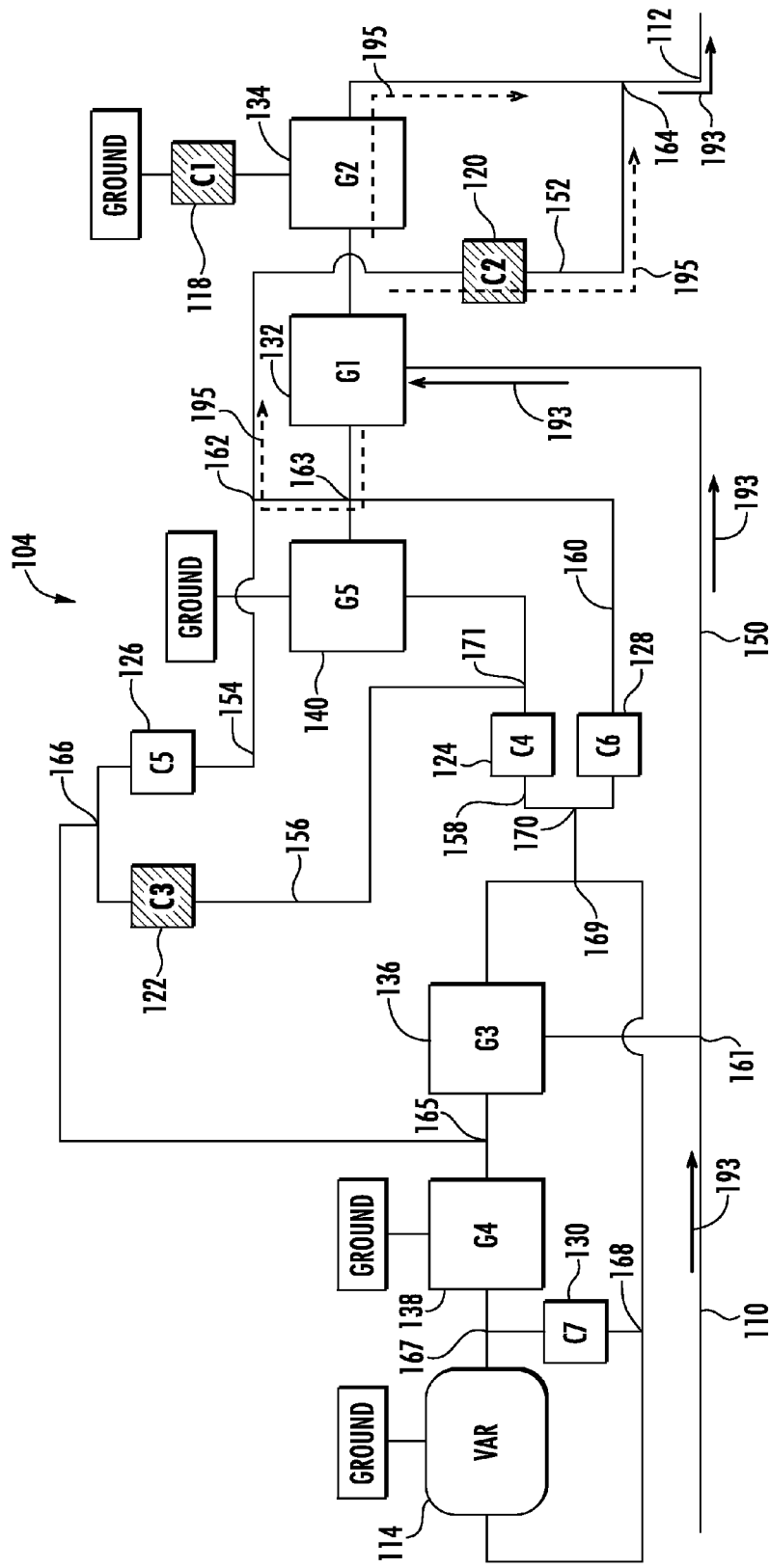
FIG. 18 is a block diagrammatic view of the infinitely variable transmission of FIG. 3 showing power flow therethrough in a fourth forward synchronous operating mode.

Turning now to the "Sync 4-5" mode of table 212, power flows from the input shaft 110 to the output shaft 112 as shown in FIG. 18. Input power 193 from the input shaft 110 is transmitted to the junction 161 and thereafter to the first gearset 132. Input power 193 transmitted to the first gearset 132 is modified by the "mixing" gearset 132 so that input power 193 becomes input power 195 that is transmitted thereafter from the first gearset 132 to the junction 164. Input power 193 is reconstituted as discussed below at the junction 164, and input power 193 reconstituted at the junction 164 flows thereafter to the output shaft 112. No power is recirculated in the "Sync 4-5" operating mode, and the variator 114 is bypassed and receives no power load in that mode.

Input power 195 (designated by the dashed arrows) is transmitted from the first gearset 132 to the junction 164 through the second gearset 134 as shown in FIG. 18. Input power 195 is also transmitted from the first gearset 132 to the junction 164 through the junctions 163, 162 and the second clutch 120 so that input power 193 is reconstituted at the junction 164 as indicated above.

Figure 19:
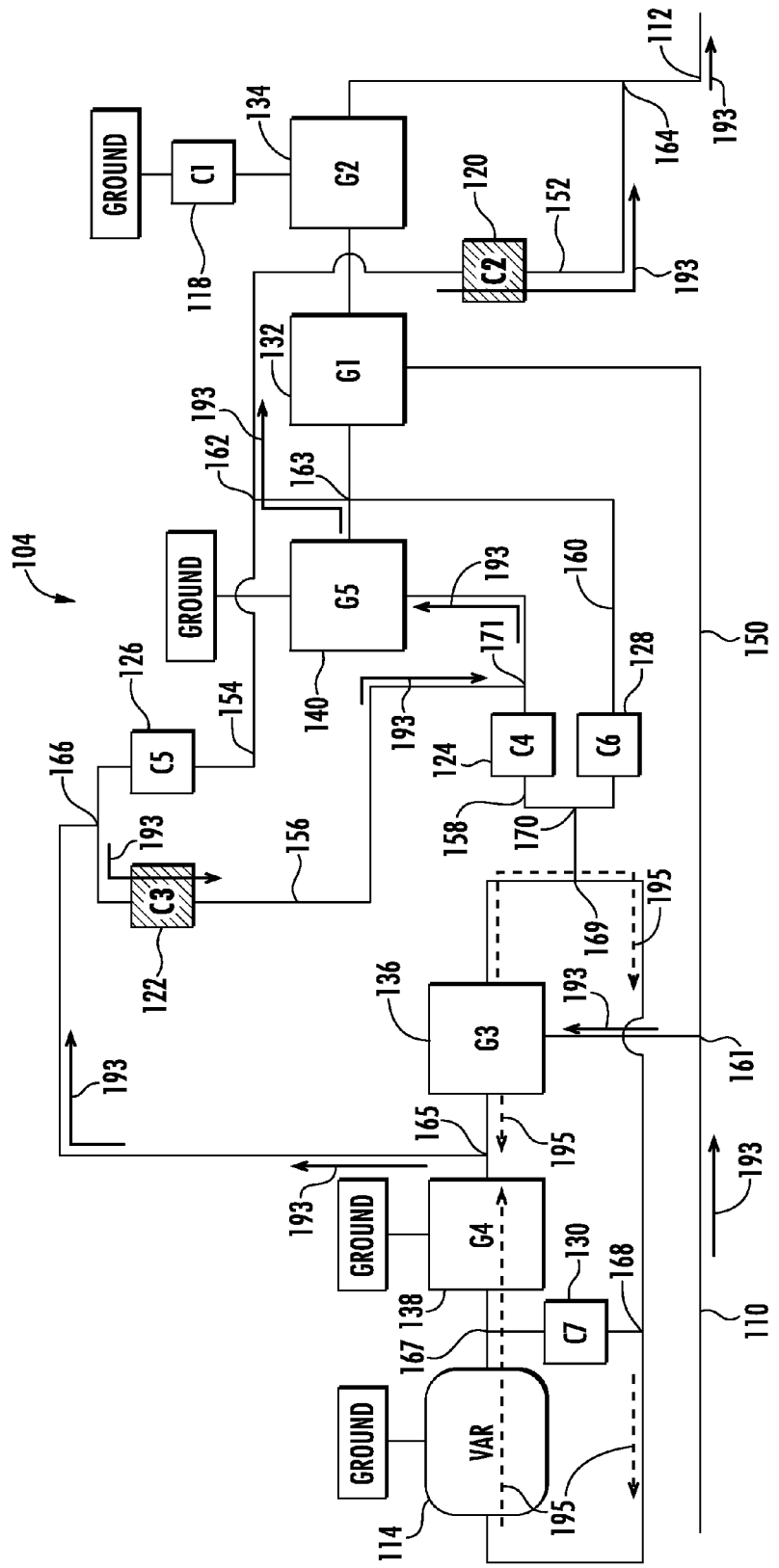
FIG. 19 is a block diagrammatic view of the infinitely variable transmission of FIG. 3 showing power flow therethrough in a fifth forward operating mode.

Turning now to "Mode 5" of table 212, power flows from the input shaft 110 to the output shaft 112 as shown in FIG. 19. Input power 193 (designated by the solid arrows) from the input shaft 110 is transmitted to the junction 161 and thereafter to the third gearset 136. Input power 193 transmitted to the third gearset 136 is modified by the "mixing" gearset 136 so that input power 193 becomes input power 195 that is transmitted thereafter from the third gearset 136 to the junction 165. Input power 193 is reconstituted at the junction 165 as discussed below, and input power 193 reconstituted at the junction 165 is transmitted to the junction 164 through the junctions 166, 171, 163, 162, the third clutch 122, the fifth gearset 140, and the second clutch 120. Input power 193 transmitted to the junction 164 is transmitted to the output shaft 112. No power is recirculated in "Mode 5" of table 212.

Input power 195 (designated by the dashed arrows) is transmitted from the third gearset 136 directly to the junction 165 as shown in FIG. 19. Input power 195 is also transmitted from the third gearset 136 to the junction 165 through the junctions 169, 168, 167, the fourth gearset 138, and the variator 114 so that input power 193 is reconstituted at the junction 165 as indicated above. The variator 114 is subjected only to the input power 195 flowing from the junction 168 to the junction 167 as shown in FIG. 19 (i.e., the variator 114 is not subjected to the entire input power 193 transmitted to the third gearset 136).

Figure 20:
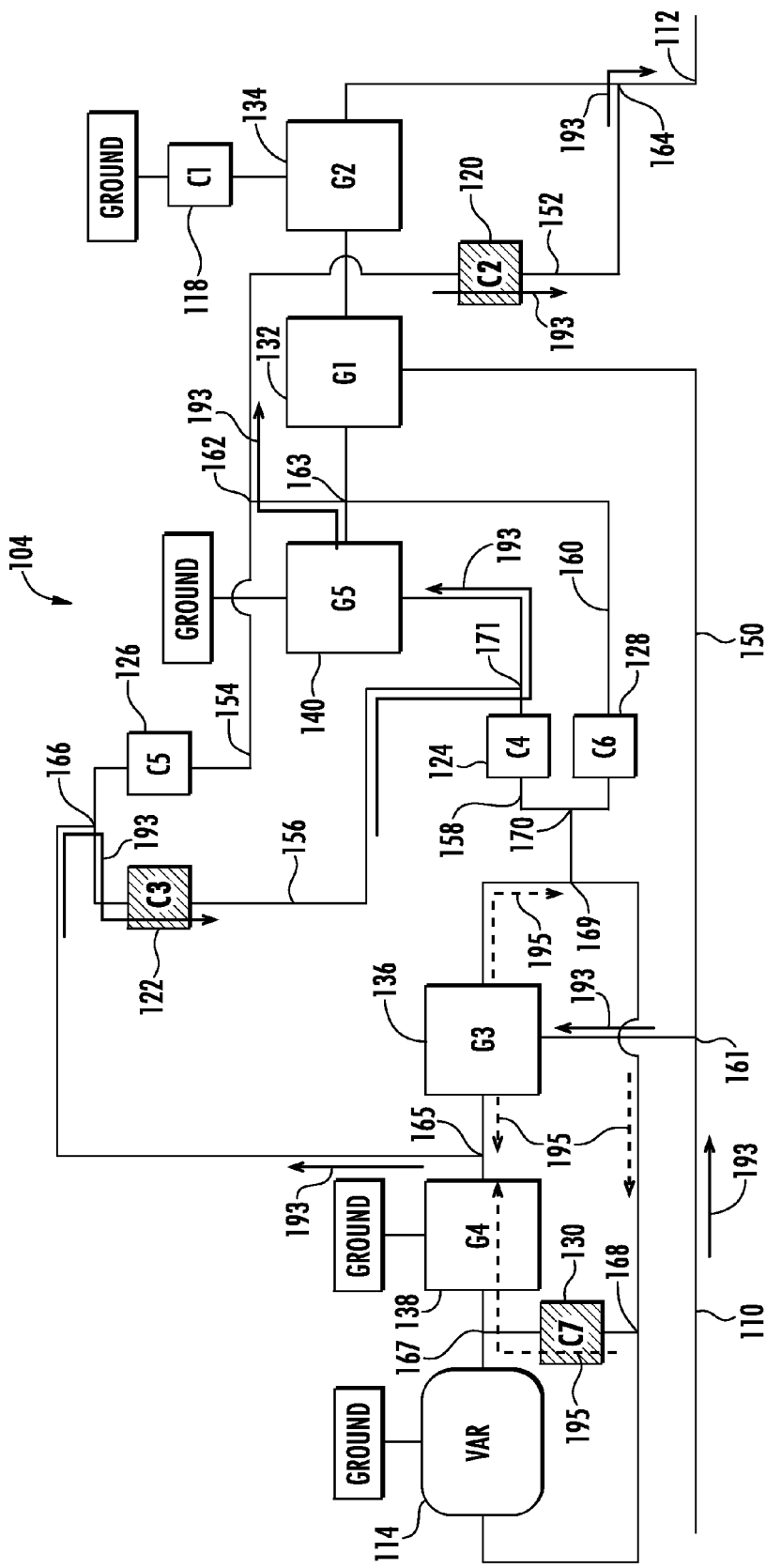
FIG. 20 is a block diagrammatic view of the infinitely variable transmission of FIG. 3 showing power flow therethrough in a fifth forward variator bypass operating mode.

Turning now to the "Bypass 5" mode of table 212, power flows from the input shaft 110 to the output shaft 112 as shown in FIG. 20. Input power 193 (designated by the solid arrows) from the input shaft 110 is transmitted to the junction 161 and thereafter to the third gearset 136. Input power 193 transmitted to the third gearset 136 is modified by the "mixing" gearset 136 so that input power 193 becomes input power 195 that is transmitted thereafter from the third gearset 136 to the junction 165. Input power 193 is reconstituted at the junction 165 as discussed below, and input power 193 reconstituted at the junction 165 is transmitted to the junction 164 through the junctions 166, 171, 163, 162, the third clutch 122, the fifth gearset 140, and the second clutch 120. Input power 193 transmitted to the junction 164 is transmitted to the output shaft 112. No power is recirculated in the "Bypass 5" mode of table 212.

Input power 195 (designated by the dashed arrows) is transmitted from the third gearset 136 directly to the junction 165 as shown in FIG. 20. Input power 195 is also transmitted from the third gearset 136 to the junction 165 through the junctions 169, 168, 167, the fourth gearset 138, and the variator bypass clutch 130 so that input power 193 is reconstituted at the junction 165 as indicated above. The variator 114 is bypassed entirely and receives no power load in the "Bypass 5" mode.

Figure 21:
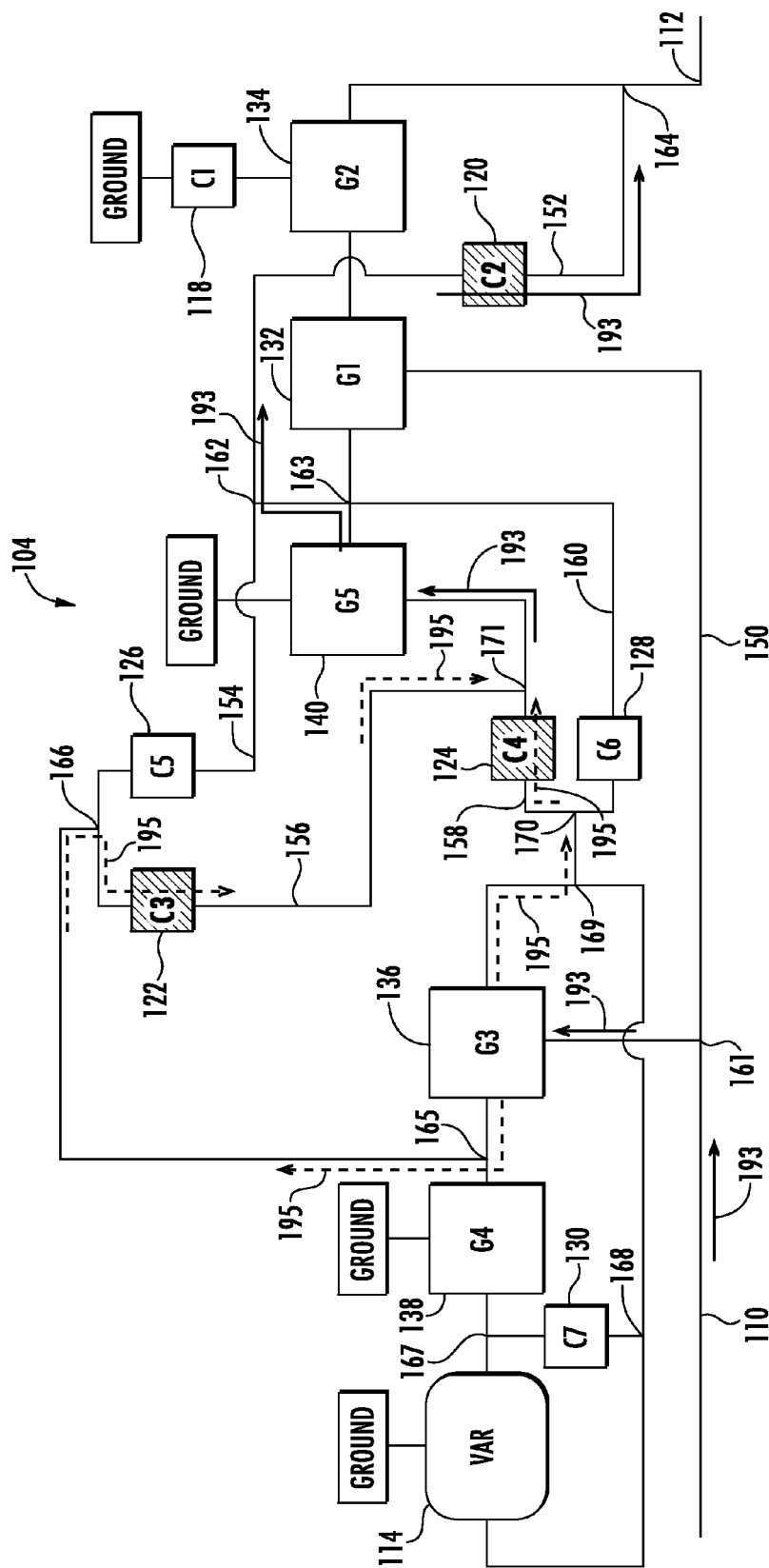
FIG. 21 is a block diagrammatic view of the infinitely variable transmission of FIG. 3 showing power flow therethrough in a fifth forward synchronous operating mode.

Turning now to the "Sync 5-6" mode of table 212, power flows from the input shaft 110 to the output shaft 112 of the transmission 104 as shown in FIG. 21. Input power 193 from the input shaft 110 is transmitted to the junction 161 and therefrom to the third gearset 136. Input power 193 transmitted to the third gearset 136 is modified by the "mixing" gearset 136 so that input power 193 becomes input power 195 that is transmitted thereafter from the third gearset 136 to the junction 171. Input power 193 is reconstituted thereafter at the junction 171 as discussed below, and input power 193 reconstituted at the junction 171 is transmitted to the junction 164 through the junctions 163, 162, the fifth gearset 140, and the second clutch 120. Input power 193 transmitted to the junction 164 is transmitted to the output shaft 112. No power is recirculated in the "Sync 5-6" mode of table 212, and the variator 114 is bypassed and receives no power load in that mode.

Input power 195 (designated by the dashed arrows) is transmitted from the third gearset 136 to the junction 171 through the junctions 165, 166 and the third clutch 122 as shown in FIG. 21. Input power 195 is also transmitted from the third gearset 136 to the junction 171 through the junctions 169, 170 and the fourth clutch 124 as shown in FIG. 21 so that input power 193 is reconstituted at the junction 171 as indicated above.

Figure 22:
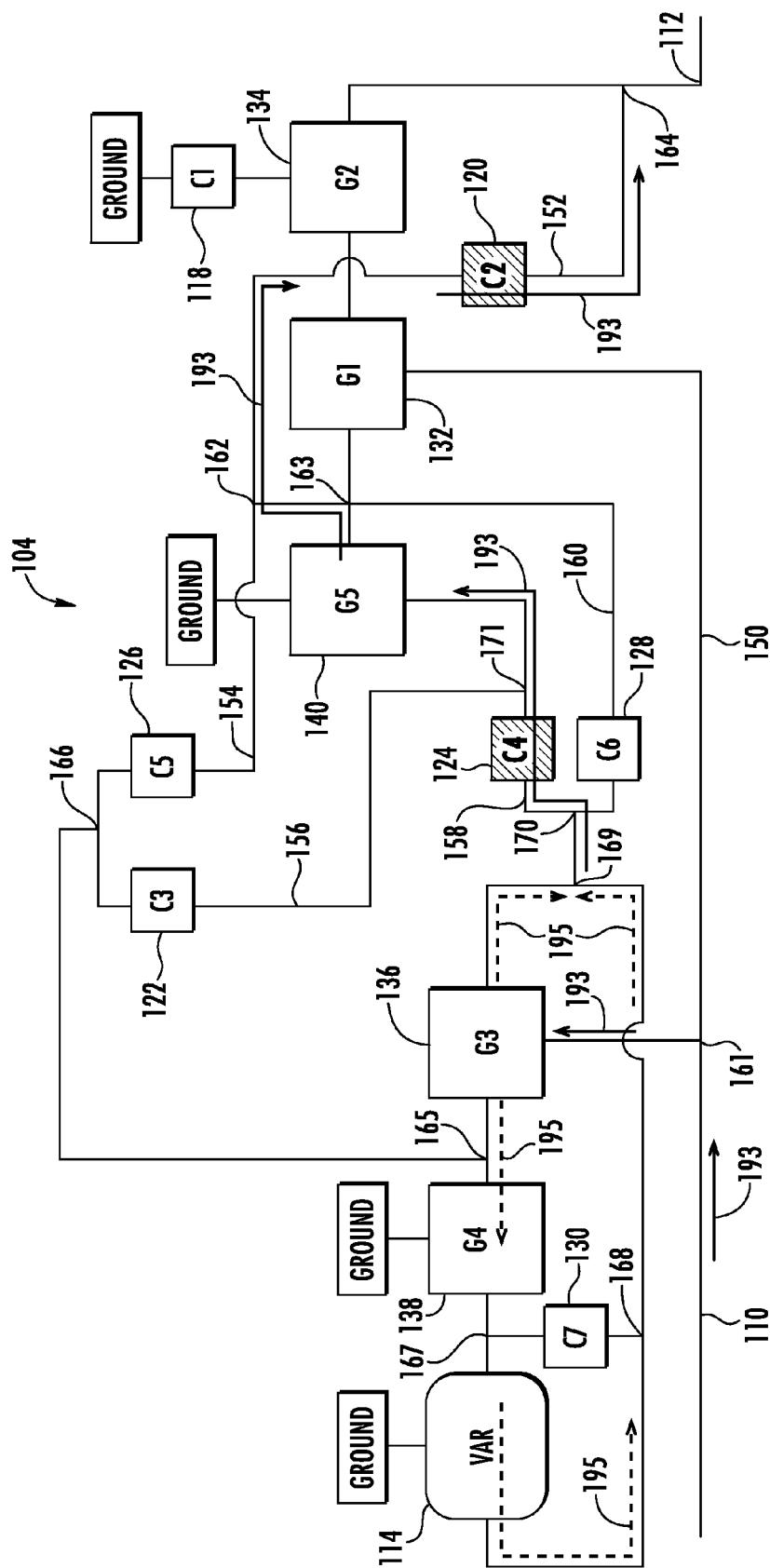
FIG. 22 is a block diagrammatic view of the infinitely variable transmission of FIG. 3 showing power flow therethrough in a sixth forward operating mode.

Turning now to "Mode 6" of table 212, power flows from the input shaft 110 to the output shaft 112 of the transmission 104 as shown in FIG. 22. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 169. Input power 193 is reconstituted thereafter at the junction 169 as discussed below, and input power 193 reconstituted at the junction 169 is transmitted to the junction 164 through the junctions 170, 171, 163, 162, the fourth clutch 124, the fifth gearset 140, and the second clutch 120. Input power 193 transmitted to the junction 164 is transmitted to the output shaft 112. No power is recirculated in "Mode 6" of table 212.

Input power 195 (designated by the dashed arrows) is transmitted from the third gearset 136 directly to the junction 169 as shown in FIG. 22. Input power 195 is also transmitted from the third gearset 136 to the junction 169 through the junctions 165, 167, 168, the fourth gearset 138, and the variator 114 as shown in FIG. 22 so that input power 193 is reconstituted at the junction 169 as indicated above. The variator 114 is subjected only to the input power 195 flowing from the junction 167 to the junction 168 as shown in FIG. 22 (i.e., the variator 114 is not subjected to the entire input power 193 transmitted to the third gearset 136).

Figure 23:
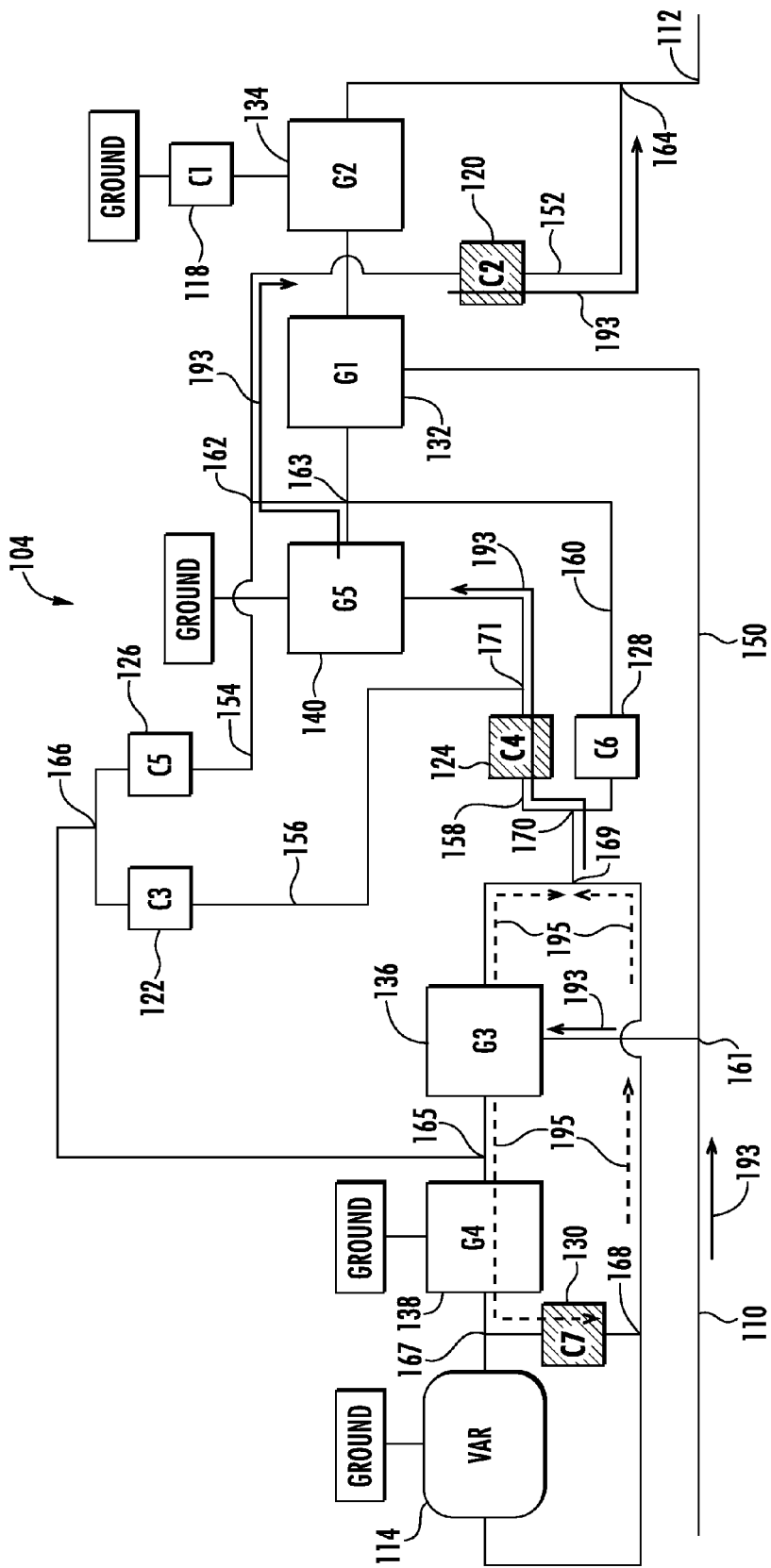
FIG. 23 is a block diagrammatic view of the infinitely variable transmission of FIG. 3 showing power flow therethrough in a sixth forward variator bypass operating mode.

Turning now to the "Bypass 6" mode of table 212, power flows from the input shaft 110 to the output shaft 112 of the transmission 104 as shown in FIG. 23. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 169. Input power 193 is reconstituted thereafter at the junction 169 as discussed below, and input power 193 reconstituted at the junction 169 is transmitted to the junction 164 through the junctions 170, 171, 163, 162, the fourth clutch 124, the fifth gearset 140, and the second clutch 120. Input power 193 transmitted to the junction 164 is transmitted to the output shaft 112. No power is recirculated in the "Bypass 6" mode of table 212.

Input power 195 (designated by the dashed arrows) is transmitted from the third gearset 136 directly to the junction 169 as shown in FIG. 23. Input power 195 is also transmitted from the third gearset 136 to the junction 169 through the junctions 165, 167, 168, the fourth gearset 138, and the variator bypass clutch 130 as shown in FIG. 23 so that input power 193 is reconstituted at the junction 169 as indicated above. The variator 114 is entirely bypassed and receives no power load in the "Bypass 6" mode.

Figure 24:
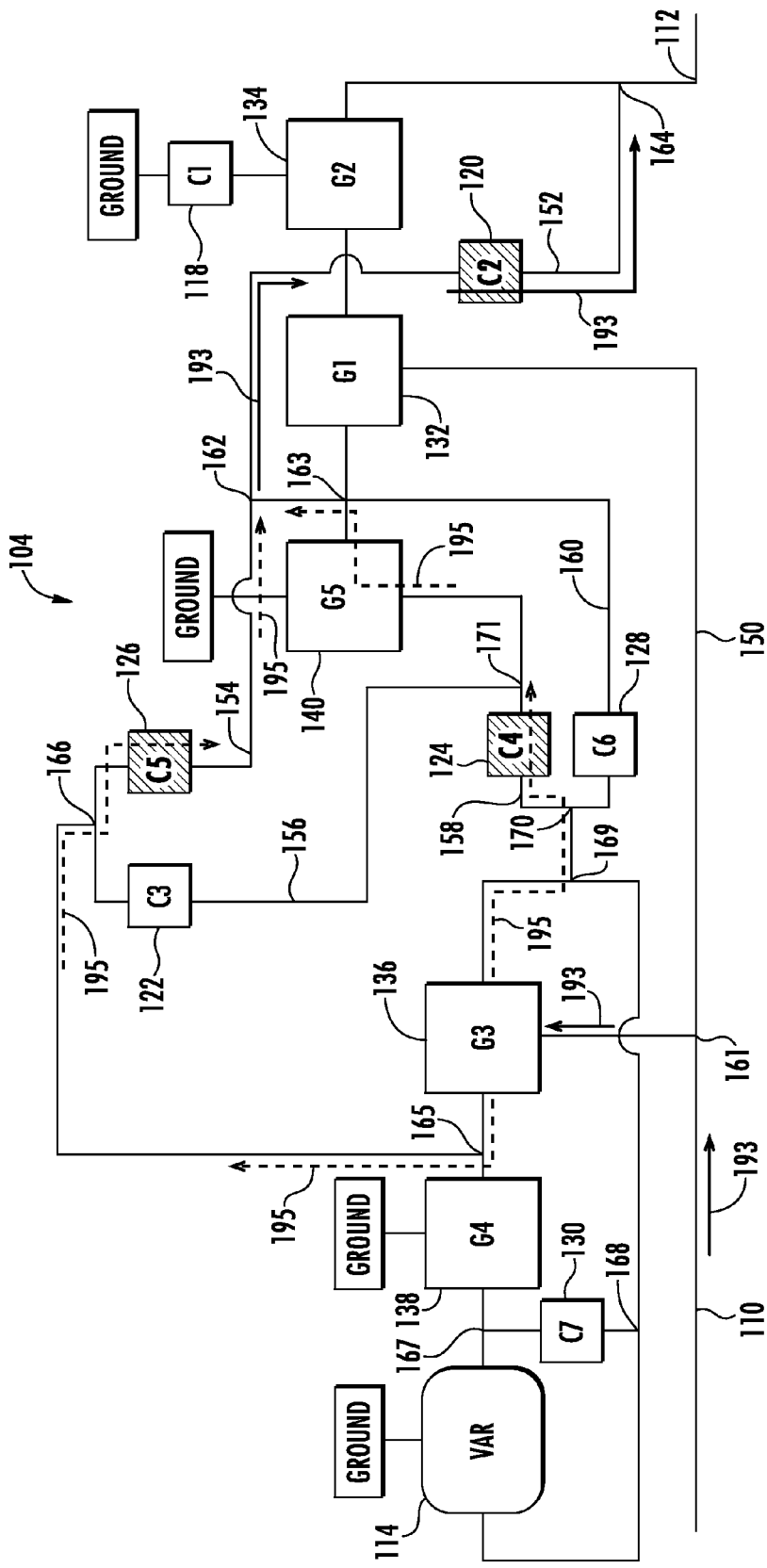
FIG. 24 is a block diagrammatic view of the infinitely variable transmission of FIG. 3 showing power flow therethrough in a sixth forward synchronous operating mode.

Turning now to the "Sync 6-7" mode of table 212, power flows from the input shaft 110 to the output shaft 112 of the transmission 104 as shown in FIG. 24. Input power 193 from the input shaft 110 is transmitted to the junction 161 and therefrom to the third gearset 136. Input power 193 transmitted to the third gearset 136 is modified by the "mixing" gearset 136 so that input power 193 becomes input power 195 that is transmitted thereafter from the third gearset 136 to the junction 162. Input power 193 is reconstituted thereafter at the junction 162 as discussed below, and input power 193 reconstituted at the junction 162 is transmitted to the junction 164 through the second clutch 120. Input power 193 transmitted to the junction 164 is transmitted to the output shaft 112. No power is recirculated in the "Sync 6-7" mode of table 212, and the variator 114 is bypassed and receives no power load in that mode.

Input power 195 (designated by the dashed arrows) is transmitted from the third gearset 136 to the junction 162 through the junctions 165, 166 and the fifth clutch 126 as shown in FIG. 24. Input power 195 is also transmitted from the third gearset 136 to the junction 162 through the junctions 169, 170, 171, 163, the fourth clutch 124, and the fifth gearset 140 as shown in FIG. 24 so that input power 193 is reconstituted at the junction 162 as indicated above.

Figure 25:
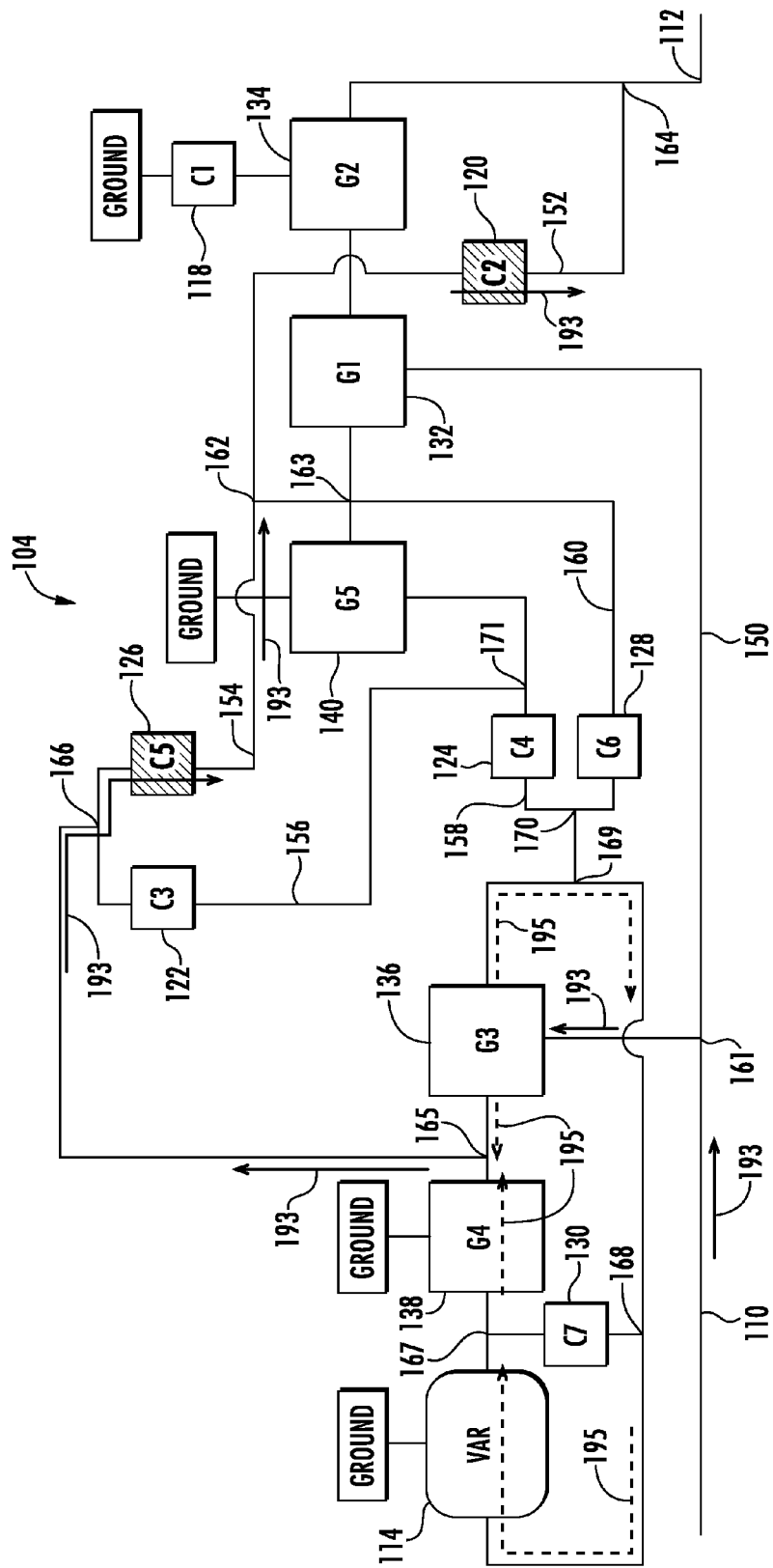
FIG. 25 is a block diagrammatic view of the infinitely variable transmission of FIG. 3 showing power flow therethrough in a seventh forward operating mode.

Turning now to "Mode 7" of table 212, power flows from the input shaft 110 to the output shaft 112 of the transmission 104 as shown in FIG. 25. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 165. Input power 193 is reconstituted thereafter at the junction 165, and input power 193 reconstituted at the junction 165 is transmitted to the junction 164 through the junctions 166, 162, the fifth clutch 126, and the second clutch 120. Input power 193 transmitted to the junction 164 flows to the output shaft 112. No power is recirculated in "Mode 7" of table 212 as shown in FIG. 25.

Input power 195 (designated by the dashed arrows) is transmitted from the third gearset 136 directly to the junction 165 as shown in FIG. 25. Input power 195 is also transmitted from the third gearset 136 to the junction 165 through the junctions 169, 168, 167, the fourth gearset 138, and the variator 114 as shown in FIG. 25. The variator 114 is subjected only to the input power 195 flowing from the junction 168 to the junction 167 (i.e., the variator 114 is not subjected to the entire input power 193 transmitted to the third gearset 136).

Figure 26:
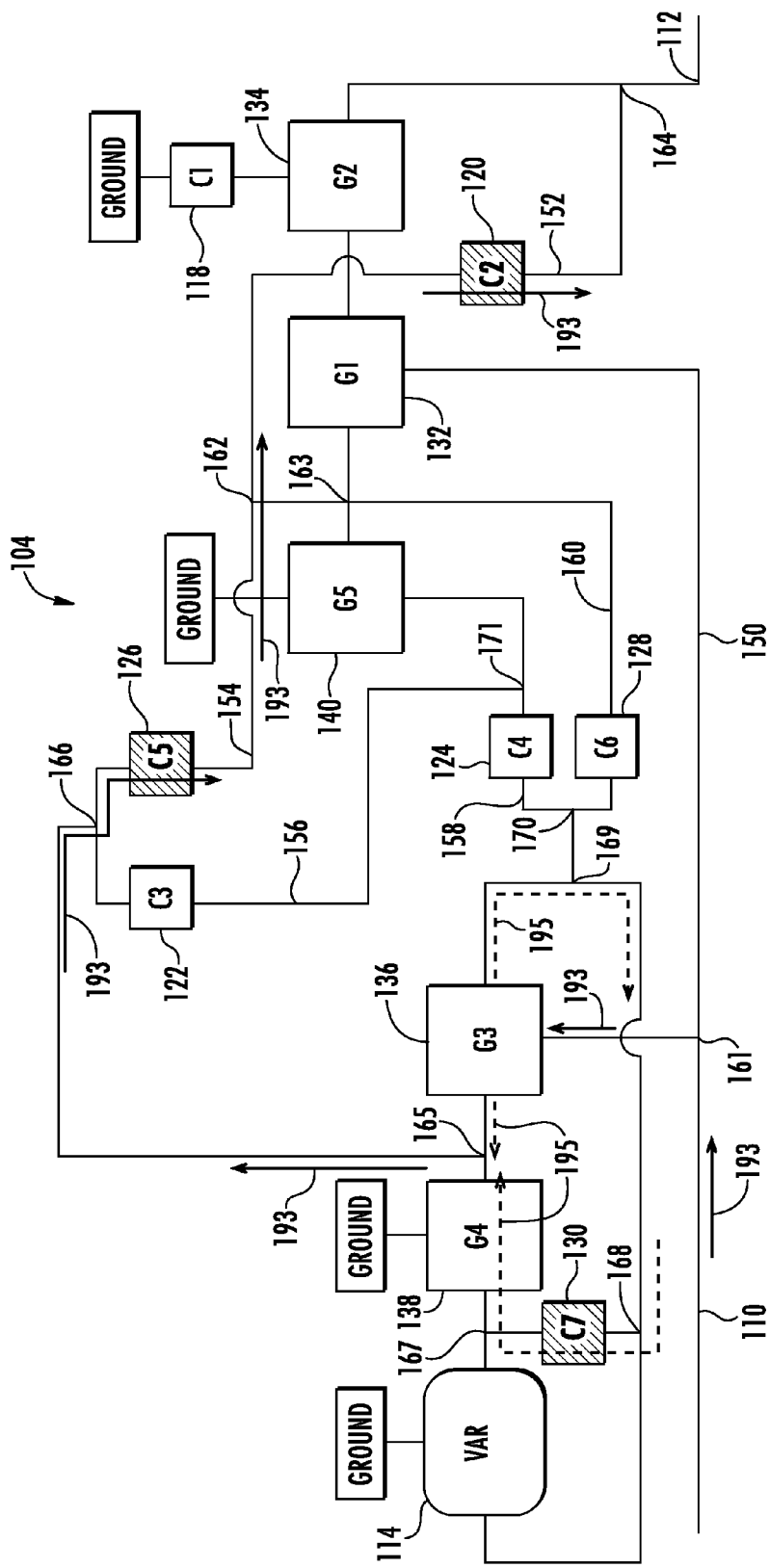
FIG. 26 is a block diagrammatic view of the infinitely variable transmission of FIG. 3 showing power flow therethrough in a seventh forward variator bypass operating mode.

Turning now to the "Bypass 7" mode of table 212, power flows from the input shaft 110 to the output shaft 112 of the transmission 104 as shown in FIG. 26. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 165. Input power 193 is reconstituted thereafter at the junction 165, and input power 193 reconstituted at the junction 165 is transmitted to the junction 164 through the junctions 166, 162, the fifth clutch 126, and the second clutch 120. Input power 193 transmitted to the junction 164 flows to the output shaft 112. No power is recirculated in the "Bypass 7" mode of table 212 as shown in FIG. 26.

Input power 195 (designated by the dashed arrows) is transmitted from the third gearset 136 directly to the junction 165 as shown in FIG. 26. Input power 195 is also transmitted from the third gearset 136 to the junction 165 through the junctions 169, 168, 167, the fourth gearset 138, and the variator bypass clutch 130 as shown in FIG. 26. The variator 114 is entirely bypassed and receives no power load in the "Bypass 7" mode.

Figure 27:
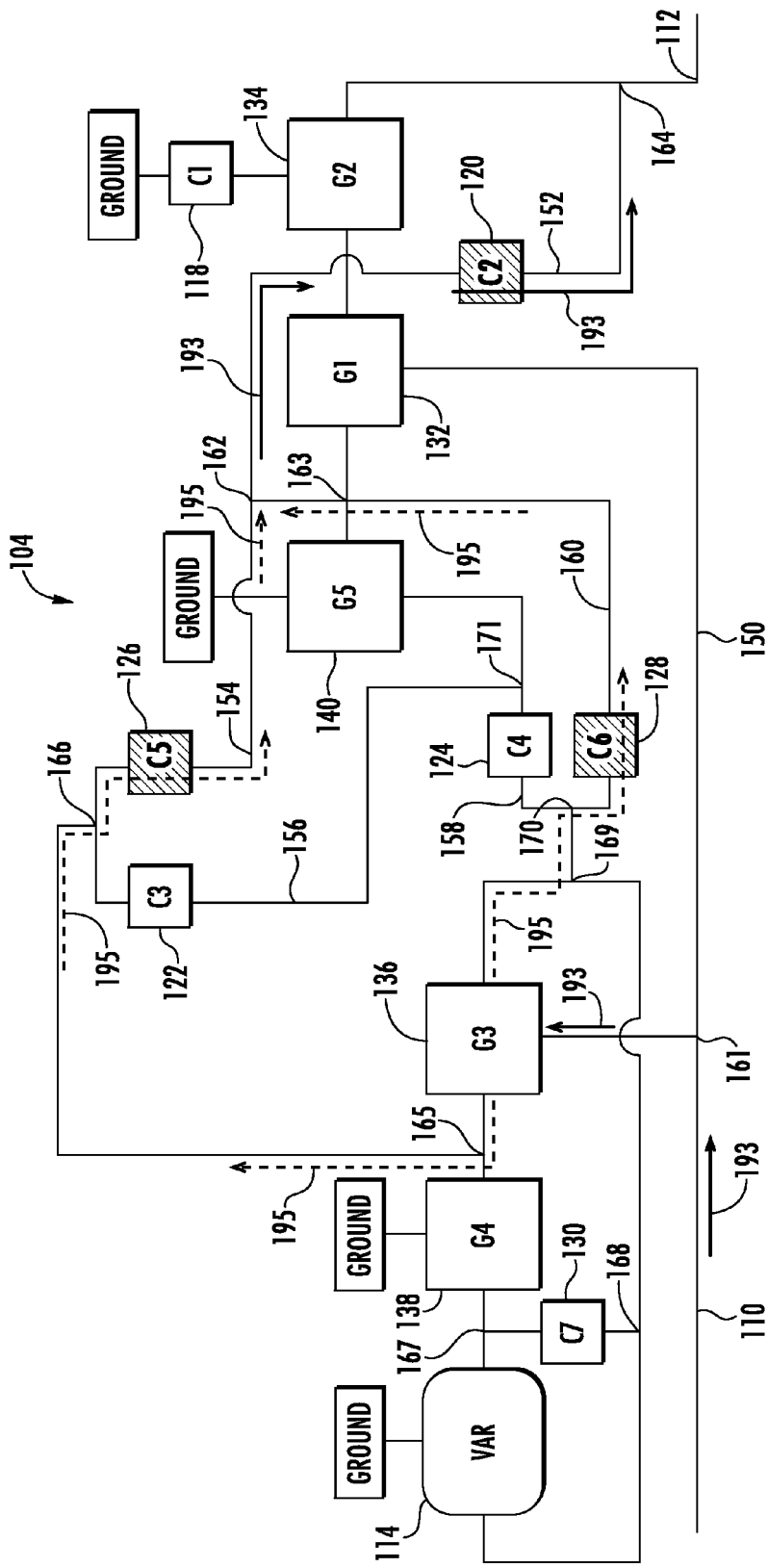
FIG. 27 is a block diagrammatic view of the infinitely variable transmission of FIG. 3 showing power flow therethrough in a seventh forward synchronous operating mode.

Turning now to the "Sync 7-8" mode of table 212, power flows from the input shaft 110 to the output shaft 112 of the transmission 104 as shown in FIG. 27. Input power 193 from the input shaft 110 is transmitted to the junction 161 and therefrom to the third gearset 136. Input power 193 transmitted to the third gearset 136 is modified by the third gearset 136 so that input power 193 becomes input power 195 that is transmitted thereafter from the third gearset 136 to the junction 162. Input power 193 is reconstituted thereafter at the junction 162 as discussed below, and input power 193 reconstituted at the junction 162 is transmitted to the junction 164 through the second clutch 120. Input power 193 transmitted to the junction 164 is transmitted to the output shaft 112. No power is recirculated in the "Sync 7-8" mode of table 212, and the variator 114 is entirely bypassed and receives no power load in that mode.

Input power 195 (designated by the dashed arrows) is transmitted from the third gearset 136 to the junction 162 through the junctions 165, 166 and the fifth clutch 126 as shown in FIG. 27. Input power 195 is also transmitted from the third gearset 136 to the junction 162 through the junctions 169, 170, 163 and the sixth clutch 128 as shown in FIG. 27 so that input power 193 is reconstituted at the junction 162 as indicated above.

Figure 28:
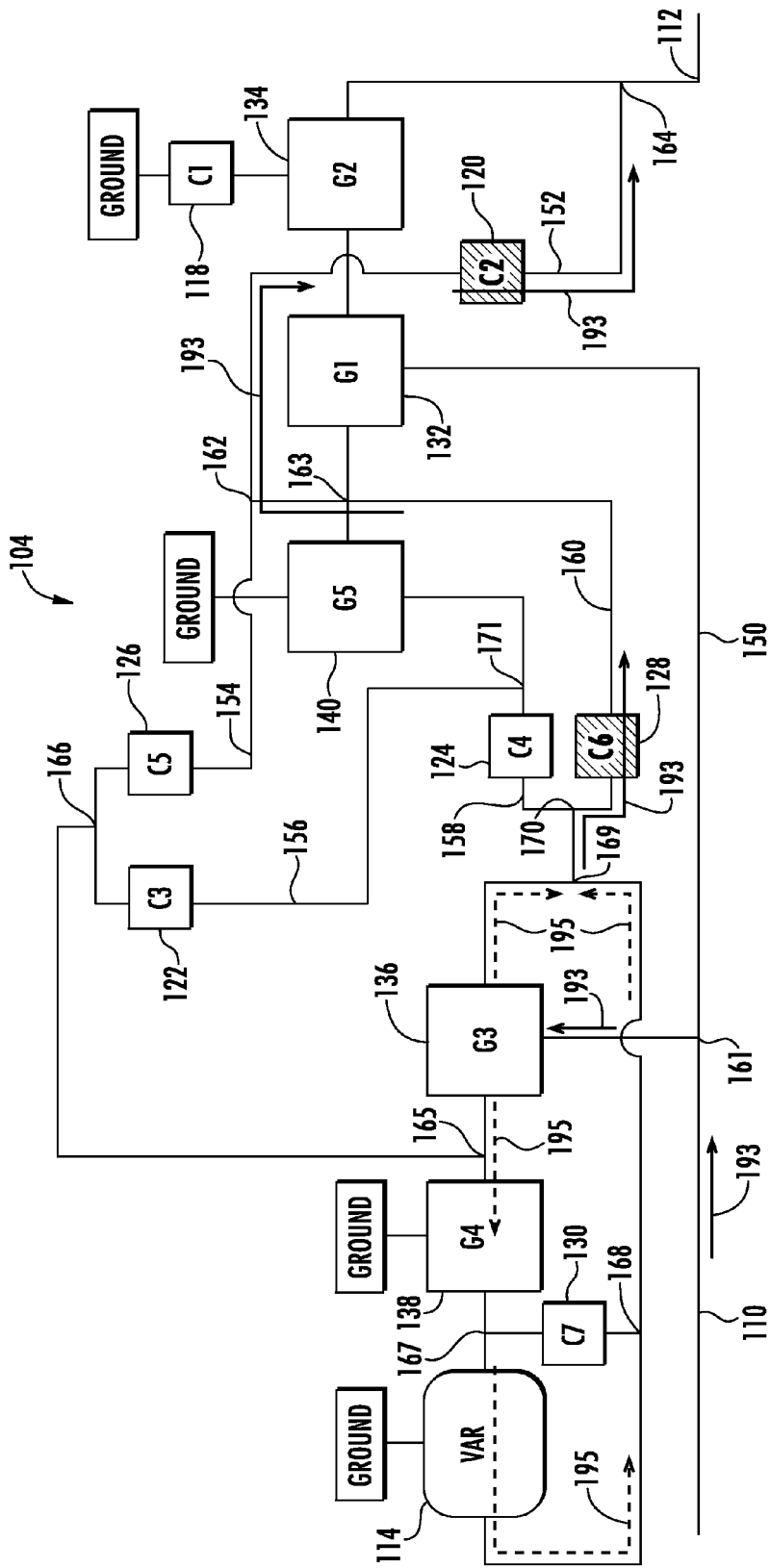
FIG. 28 is a block diagrammatic view of the infinitely variable transmission of FIG. 3 showing power flow therethrough in an eighth forward operating mode.

Turning now to "Mode 8" of table 212, power flow from the input shaft 110 to the output shaft 112 of the transmission 104 is shown in FIG. 28. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 169. Input power 193 is reconstituted thereafter at the junction 169 as discussed below, and input power 193 reconstituted at the junction 169 is transmitted to the junction 164 through the junctions 170, 163, 162, the sixth clutch 128, and the second clutch 120. Input power 193 transmitted to the junction 164 is transmitted to the output shaft 112. No power is recirculated in "Mode 8" of table 212 as shown in FIG. 28.

Input power 195 (designated by the dashed arrows) is transmitted from the third gearset 136 directly to the junction 169 as shown in FIG. 28. Input power 195 is also transmitted from the third gearset 136 to the junction 169 through the junctions 165, 167, 168, the fourth gearset 138, and the variator 114 as shown in FIG. 28 so that input power 193 is reconstituted at the junction 169 as indicated above. The variator 114 is subjected only to the input power 195 flowing from the junction 167 to the junction 168 (i.e., the variator 114 is not subjected to the entire input power 193 transmitted to the third gearset 136).

Figure 29:
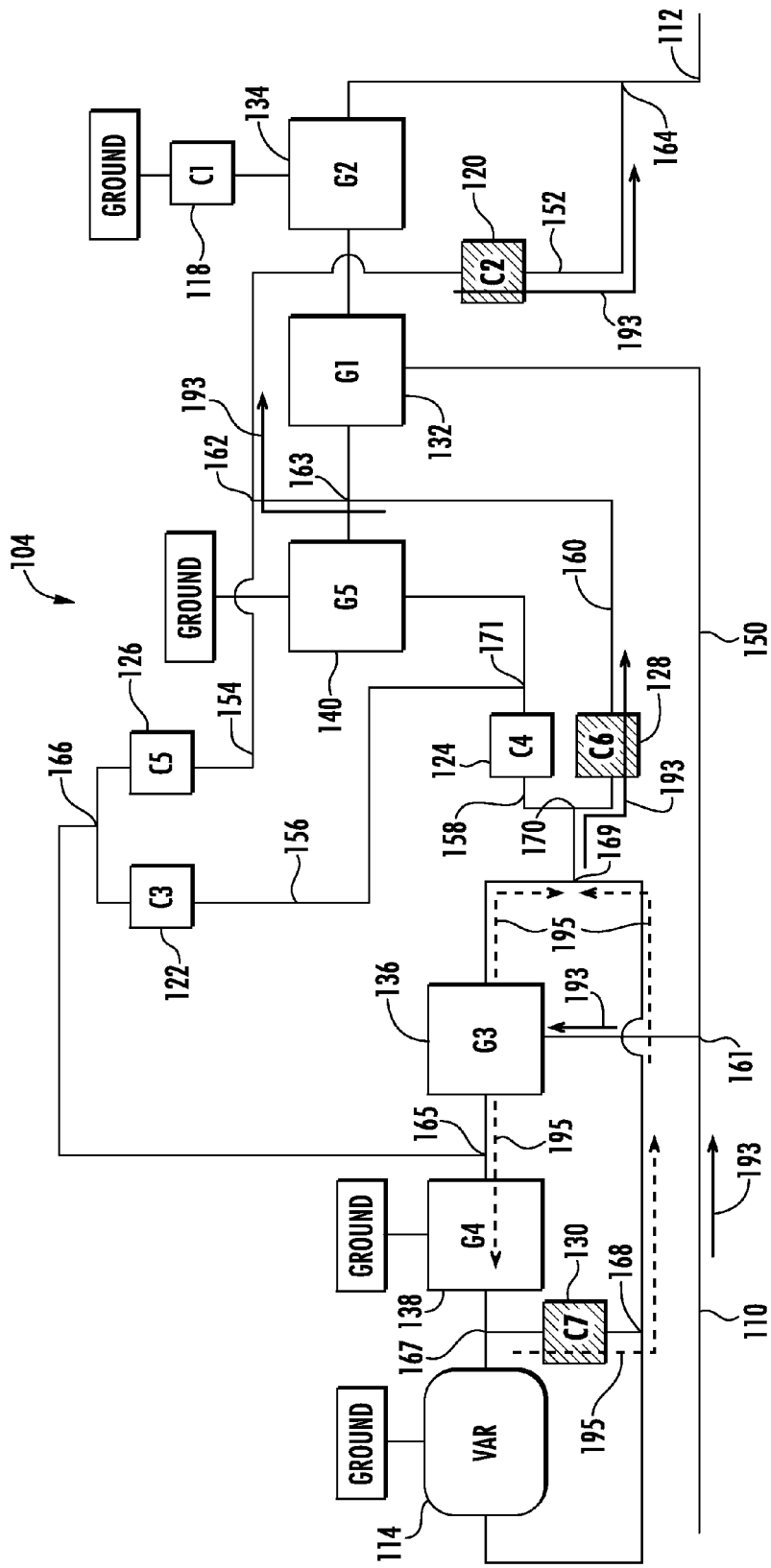
FIG. 29 is a block diagrammatic view of the infinitely variable transmission of FIG. 3 showing power flow therethrough in an eighth forward variator bypass operating mode.

Turning now to the "Bypass 8" mode of table 212, power flow from the input shaft 110 to the output shaft 112 of the transmission 104 is shown in FIG. 29. Input power 193 (designated by the solid arrows) from the input shaft 110 is transmitted to the junction 161 and therefrom to the third gearset 136. Input power 193 transmitted to the third gearset 136 is modified by the "mixing" gearset 136 so that the input power 193 becomes input power 195 that is transmitted thereafter from the third gearset 136 to the junction 169. Input power 193 is reconstituted thereafter at the junction 169 as discussed below, and input power 193 reconstituted at the junction 169 is transmitted to the junction 164 through the junctions 170, 163, 162, the sixth clutch 128, and the second clutch 120. Input power 193 transmitted to the junction 164 is transmitted to the output shaft 112. No power is recirculated in "Mode 8" of table 212 as shown in FIG. 29.

Input power 195 (designated by the dashed arrows) is transmitted from the third gearset 136 directly to the junction 169 as shown in FIG. 29. Input power 195 is also transmitted from the third gearset 136 to the junction 169 through the junctions 165, 167, 168, the fourth gearset 138, and the variator bypass clutch 130 as shown in FIG. 29 so that input power 193 is reconstituted at the junction 169 as indicated above. The variator 114 is entirely bypassed and receives no power load in the "Bypass 8" mode.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
   an input shaft configured to receive torque from a drive unit,
   an output shaft configured to transmit torque to a load,
   at least five planetary gearsets arranged between the input shaft and the output shaft,
   a variable-ratio unit arranged between the input shaft and the output shaft, and
   at least six clutches arranged between the input shaft and the output shaft, the at least six clutches selectively engageable in combination with one another to select one of at least eight operating modes,
   wherein the at least eight operating modes include at least one transition mode in which the transmission is operable to provide a mechanical fixed speed ratio between the input shaft and the output shaft.

2. The transmission of claim 1, wherein (i) the at least five planetary gearsets include no more than five planetary gearsets, and (ii) the at least six clutches include no more than six clutches.

3. The transmission of claim 1, wherein the at least eight operating modes include no more than eight operating modes.

4. The transmission of claim 1, wherein (i) the transmission is operable to receive a first plurality of input speeds at the input shaft and provide a second plurality of output speeds at the output shaft, and (ii) the at least eight operating modes include a first mode in which one of the second plurality of output speeds is equal to zero for the first plurality of input speeds.

5. The transmission of claim 4, wherein the transmission is operable to provide (i) a range of negative speed ratios between the input shaft and the output shaft in the first mode, and (ii) a range of positive speed ratios between the input shaft and the output shaft in the first mode.

6. The transmission of claim 3, wherein the transmission is operable to provide (i) a range of negative speed ratios between the input shaft and the output shaft in each of two reverse modes of the eight operating modes and (ii) a range of positive speed ratios between the input shaft and the output shaft in each of five forward modes of the eight operating modes.

7. The transmission of claim 6, wherein the transmission is operable to engage at least two of the at least six clutches in each of (i) the two reverse modes and (ii) the five forward modes.

8. The transmission of claim 1, wherein the at least eight operating modes comprises at least fifteen operating modes.

9. The transmission of claim 8, wherein the at least fifteen operating modes include seven transition modes in which the transmission is operable to provide a fixed speed ratio between the input shaft and the output shaft.

10. The transmission of claim 9, wherein the transmission is operable to engage at least three of the at least six clutches in each of the seven transition modes.

11. A transmission comprising:
a housing,
an input shaft configured to receive torque from a drive unit,
an output shaft configured to transmit torque to a load,
a variable-ratio unit arranged between the input shaft and the output shaft, the variable-ratio unit being configured to output torque from an input of the variable-ratio unit to an output of the variable-ratio unit,
at least five planetary gearsets arranged between the input shaft and the output shaft, the at least five planetary gearsets including (i) a first planetary gearset coupled to the input shaft and the variable-ratio unit and (ii) a second planetary gearset coupled to the first planetary gearset, the variable-ratio unit, and the housing, and
at least six clutches arranged between the input shaft and the output shaft, the at least six clutches selectively engageable in combination with one another to select one of at least eight operating modes,
wherein the at least eight operating modes include at least one transition mode in which the transmission is operable to provide a mechanical fixed speed ratio between the input shaft and the output shaft.

12. The transmission of claim 11, wherein each of the first and second planetary gearsets includes an idler gear.

13. The transmission of claim 11, wherein (i) a ring gear of the first planetary gearset is coupled to the input shaft, and (ii) a carrier of the first planetary gearset is coupled to the input of the variable-ratio unit.

14. The transmission of claim 11, wherein (i) a ring gear of the second planetary gearset is coupled to a sun gear of the first planetary gearset, (ii) a sun gear of the second planetary gearset is coupled to the output of the variable-ratio unit, and (iii) a carrier of the second planetary gearset is coupled to the housing.

15. The transmission of claim 11, wherein (i) the at least five planetary gearsets include a third planetary gearset coupled to the housing, and (ii) the at least six clutches include a first clutch engageable to couple a carrier of the first planetary gearset to a carrier of the third planetary gearset.

16. The transmission of claim 15, wherein the at least six clutches include a second clutch engageable to couple the carrier of the first planetary gearset to a sun gear of the third planetary gearset.

17. The transmission of claim 16, wherein the at least six clutches include a third clutch engageable to couple a ring gear of the second planetary gearset to the carrier of the third planetary gearset.

18. The transmission of claim 17, wherein the at least six clutches include a fourth clutch engageable to couple the ring gear of the second planetary gearset to the sun gear of the third planetary gearset.

19. The transmission of claim 18, wherein the transmission is operable to (i) disengage one of the first clutch and the second clutch in each of the at least eight operating modes in which the other of the first clutch and the second clutch is engaged, and (ii) disengage one of the third clutch and the fourth clutch in each of the at least eight operating modes in which the other of the third clutch and the fourth clutch is engaged.

20. A transmission comprising:
a housing,
an input shaft configured to receive torque from a drive unit,
an output shaft configured to transmit torque to a load,
a variable-ratio unit arranged between the input shaft and the output shaft,
at least five planetary gearsets arranged between the input shaft and the output shaft, the at least five planetary gearsets including (i) a first planetary gearset coupled to the input shaft and the variable-ratio unit and (ii) a second planetary gearset coupled to the first planetary gearset, the variable-ratio unit, and the housing, and
at least six clutches arranged between the input shaft and the output shaft, the at least six clutches selectively engageable in combination with one another to select one of at least eight operating modes, the at least six clutches including (i) a first pair of clutches being engageable in combination with one another to couple a first element of the second planetary gearset to a first element of the first planetary gearset in one of the at least eight operating modes and (ii) a second pair of clutches being engageable in combination with one another to couple the first element of the second planetary gearset to the first element of the first planetary gearset in another of the at least eight operating modes.

* * * * *